United States Patent [19]
Shimada et al.

[11] Patent Number: 5,795,082
[45] Date of Patent: Aug. 18, 1998

[54] PRINTING SYSTEM UTILIZING INKS OF DIFFERENT DENSITIES, CARTRIDGE USED THEREFOR, AND METHOD OF RECORDING IMAGES

[75] Inventors: Kazumichi Shimada; Toshiaki Kakutani, both of Suwa, Japan

[73] Assignee: Seiko Epson Corporation, Tokyo, Japan

[21] Appl. No.: 882,289

[22] Filed: Jun. 25, 1997

[30] Foreign Application Priority Data

Jun. 27, 1996 [JP] Japan .................. 8-188233
Oct. 18, 1996 [JP] Japan .................. 8-297608

[51] Int. Cl.⁶ .................................................. B41J 2/36
[52] U.S. Cl. .................. 400/120.09; 347/3; 347/15; 358/520; 395/131
[58] Field of Search .................. 400/120.01, 120.09; 358/458, 298, 559, 461, 518, 296, 520, 521; 395/106, 108, 109, 131; 347/3, 15, 43

[56] References Cited

U.S. PATENT DOCUMENTS

| | | | |
|---|---|---|---|
| 4,560,997 | 12/1985 | Sato et al. | 347/15 |
| 4,614,967 | 9/1986 | Sayanagi | 347/43 |
| 4,811,108 | 3/1989 | Numakura et al. | 347/3 |
| 4,959,790 | 9/1990 | Morgan | 358/518 |
| 5,016,097 | 5/1991 | Shimano | 347/3 |
| 5,146,236 | 9/1992 | Hirata et al. | 347/15 |
| 5,315,382 | 5/1994 | Tanioka | 358/523 |
| 5,345,315 | 9/1994 | Shalit | 347/3 |
| 5,386,305 | 1/1995 | Usami | 358/528 |
| 5,430,469 | 7/1995 | Shioya et al. | 347/15 |
| 5,477,246 | 12/1995 | Hirabayashi et al. | 347/17 |
| 5,572,632 | 11/1996 | Laumeyer et al. | 395/116 |
| 5,611,028 | 3/1997 | Shibasaki et al. | 347/3 |

FOREIGN PATENT DOCUMENTS

| | | |
|---|---|---|
| 60-56557 | 4/1985 | Japan . |
| 61-108254 | 5/1986 | Japan . |

*Primary Examiner*—Eugene H. Eickholt
*Attorney, Agent, or Firm*—Oblon, Spivak, McClelland, Maier & Neustadt, P.C.

[57] ABSTRACT

The present invention utilizes a high-density ink and a low-density ink with respect to a specific color ink, so as to improve the printing quality. The procedure of the present invention reads a recording ratio of deep dots by the high-density ink corresponding to input tone data from a table and determines whether or not deep dots by the high-density ink are to be formed in a target pixel. In case that deep dots are to be formed, a piezoelectric element PE on a head of the high-density ink is driven to form deep dots. In case that deep dots are not to be formed, on the other hand, the procedure determines whether or not light dots by the low-density ink are to be formed in the target pixel by referring to the table, and specifies the on/off state of the light dots in order to cause a mean recording ratio of the light dots to be equal to a predetermined value. In the table, formation of deep dots starts in the range of tone data smaller than the specific value of tone data that gives a maximum recording ratio of light dots resulting in smooth color mixture at a joint between the record with light dots and the record with deep dots. The recording ratio of light dots may be varied according to the density of another color ink at a position corresponding to the target pixel as well as the density of the target color ink.

34 Claims, 24 Drawing Sheets

Fig. 10

INK COMPOSITIONS AND PROPERTIES

| | | C1 | C2 | M1 | M2 | Y | Bk |
|---|---|---|---|---|---|---|---|
| DYES | Directblue99 | 3.6 | 0.9 | | | | |
| | Acidred289 | | | 2.8 | 0.7 | | |
| | Directyellow86 | | | | | 1.8 | |
| | Foodblack2 | | | | | | 4.8 |
| DIETHYLENE GLYCOL | | 30 | 35 | 20 | 25 | 30 | 25 |
| SURFINOL 465 | | 1 | 1 | 1 | 1 | 1 | 1 |
| WATER | | 65.4 | 63.1 | 79 | 74 | 69 | 74 |
| VISCOSITY (mPa·s) | | 3.0 | 3.0 | 3.0 | 3.0 | 3.0 | 3.0 |

5,795,082

1

PRINTING SYSTEM UTILIZING INKS OF DIFFERENT DENSITIES, CARTRIDGE USED THEREFOR, AND METHOD OF RECORDING IMAGES

BACKGROUND OF THE INVENTION

1. Field of the Invention

The present invention relates to a printing technique utilizing inks of different densities, that is, high-density ink and low-density ink. More particularly the present invention pertains to a printing system for regulating a distribution of dots formed by at least two inks of different densities based on tone signals representing an image, so as to print a multi-tone image, a cartridge used for such a printing system, a method of printing images, and a computer program product for realizing the method.

2. Description of the Related Art

Color printers, in which a plurality of color inks are discharged from a head, are widely used as an output device of a computer that records a multi-color, multi-tone image processed by the computer. A multi-color image is, for example, printed with three color inks, cyan, magenta, and yellow (CMY). In such a color printer, the size of dots formed on a sheet of paper by a discharge of ink is fixed, and the tone of an image to be printed is expressed by the density of dots (that is, the recording density of dots per unit area). While the density of dots formable per predetermined length has been increasing year after year, the resolution is limited to only 300 through 720 dpi in printers. The resolution of printers is significantly lower than the resolution of silver photography, which has reached several thousand dpi.

In a printer that expresses an image by the existence or non-existence of dots (the on/off state of dots), dots are sparsely formed in an area of low image density, that is, in an area of low density of dots to be printed. This increases the degree of granularity and makes the dots conspicuous. A printing system and a method utilizing inks of different densities have been proposed to improve the printing quality. The proposed technique utilizes a high-density ink and a low-density ink for a certain color and regulates discharge of these inks, thereby realizing print with an excellent tone expression. By way of example, a method of and an apparatus for recording a multi-tone image are disclosed in JAPANESE PATENT LAYING-OPEN GAZETTE No. 61-108254. The disclosed technique provides a head for forming deep dots and light dots for a certain color and regulates the number and overlap of deep dots and light dots formed in a predetermined dot matrix according to input density information of an image, so as to record a multi-tone image.

The proposed printing system utilizing inks of different densities, however, does not give any specific idea on the allocation of high-density ink and low-density ink to the input tone signals of an original image. Inks of different densities are simply allocated in the order of densities to the input tone signals of the image (for example, FIG. 9 in JAPANESE PATENT LAYING-OPEN GAZETTE No. 2-215541).

SUMMARY OF THE INVENTION

One object of the present invention is thus to enable a high-density ink and a low-density ink to be adequately allocated to input tone signals of an original image in a printing system that allows discharge of inks of different densities for a certain color, thereby improving the quality of a printed image.

2

Another object of the present invention is to improve a tone expression, especially in a low-density area included in an original image or at a joint between a low-density area and a high-density area.

Still another object of the present invention is to provide a cartridge suitable for such a printing system.

At least part of the above and the other related objects is realized by a first printing system of the present invention. The printing system comprises:

input means for inputting tone signals of the original image to be printed;

definition means for defining a recording characteristic that starts formation of dots by a higher-density ink in a range of the tone signals lower than a specific tone signal which gives a maximum recording density of dots by a lower-density ink;

specifying means for specifying existence and non-existence of dots by the at least two inks of different densities according to the tone signals, based on the recording characteristic; and regulating means for regulating discharge of each ink from the head, so as to realize a tone expression according to the existence and non-existence of dots by the at least two inks of different densities.

Dots by the higher-density ink start mixing with dots by the lower-density ink before the recording density of dots by the lower-density ink reaches a maximum. This structure realizes a smooth tone expression.

The present invention is also directed to a second printing system. The printing system comprises:

input means for receiving tone signals of an original image to be printed;

definition means for defining a recording characteristic that abruptly decreases a recording density of dots by a lower-density ink in a range of the tone signals higher than a specific tone signal which gives a maximum recording density of dots by the lower-density ink;

specifying means for specifying existence and non-existence of dots by the at least two inks of different densities according to the input tone signals, based on the recording characteristic; and regulating means for regulating discharge of each ink from the head, so as to realize a tone expression according to the existence and non-existence of dots by the at least two inks of different densities.

When the recording density of dots by the lower-density ink exceeds the maximum and dots by the higher-density ink start mixing with dots by the lower-density ink, the recording density of dots by the lower-density ink abruptly decreases. This structure realizes a smooth tone expression.

In either of the first printing system and the second printing system, the definition means may have a table for specifying the recording densities of dots by the at least two inks of different densities corresponding to the input tone signals. This simplifies arithmetic operations.

In case that the at least two inks of different densities include a high-density ink and a low density ink, it is preferable that a dye density of the low-density ink is approximately one quarter a dye density of the high-density ink. This proportion ensures a smooth tone variation in actual prints.

In either of the first printing system and the second printing system, the head may include a plurality of heads for discharging the at least two inks of different densities with respect to a plurality of color inks having different hues.

In this structure, it is preferable that the printing system further comprising a set of the definition means, the specifying means, and the regulating means corresponding to the plurality of color inks having different hues. This structure allows dots by the higher-density ink and the lower-density ink to be formed with respect to the plurality of color inks having different hues. The plurality of color inks having different hues may be cyan ink and magenta ink.

In accordance with one preferable application, each specifying means specifies the recording densities of dots in a target pixel, in connection with data of another color ink discharged to the target pixel. This structure enables the recording density of dots by the lower-density ink to be varied, thereby ensuring adequate formation of dots in color prints. It is especially preferable that each color dot formation means decreases the recording density of dots by the lower-density ink in a target pixel with an increase in density of another color ink discharged to the target pixel. This structure reduces discharge of the lower-density ink at a position where the plurality of color inks are discharged, thus decreasing the total amount of inks per unit area. This enables discharge of each color ink with a sufficient margin to the ink duty set for each paper, that is, restriction of the amount of ink dischargeable per unit area.

There are a variety of structures applicable to discharge inks. The available structure may have a mechanism for discharging ink particles under a pressure applied to each ink running through an ink conduit by application of a voltage to a piezoelectric element disposed in the ink conduit, or a mechanism for discharging ink particles under a pressure applied to each ink running through an ink conduit by air bubbles that are produced by a supply of electricity to a heating body disposed in the ink conduit. These mechanisms give very fine ink particles and enable adequate regulation of the amount of each ink. A number of nozzles for spraying the ink particles may be formed on the head. In this case, a plurality of nozzles are arranged in a feeding direction of a sheet of paper, on which the multi-tone image is printed, for each color ink of each density. This structure enhances the printing rate.

The present invention is also directed to a third printing system having a head for discharging a plurality of color inks having different hues as well as at least two inks of different densities with respect to one of the plurality of color inks having different hues. The third printing system specifies recording densities of dots by the plurality of color inks having different hues based on the input tone signals of an original image to be printed, and determines a recording density of dots formed in a target pixel by a low-density ink among the at least two inks of different densities, in connection with a density of another color ink discharged to the target pixel. This structure correlates the recording density of dots by the low-density ink with the density of another color ink.

In accordance with one preferable structure, the recording density of dots formed in the target pixel by the low-density ink is decreased with an increase in density of another color ink discharged to the target pixel. This structure reduces the recording density of dots by the low-density ink without affecting the apparent picture quality and thereby relieves the restriction of ink duty.

In accordance with another preferable structure, the third printing system of the present invention uses a look-up table for directly specifying recording densities of the deep dots and light dots with respect to one of the plurality of color inks having different hues, from the tone signals. This enables high-speed determination of recording densities.

The present invention also provides an ink cartridge used for any one of the printing systems discussed above. The ink cartridge of the present invention includes a black ink cartridge and a color ink cartridge that is separate from the black ink cartridge and reserves a plurality of color inks including at least two inks of different densities. This structure allows the black ink cartridge that is more frequently used for printing characters and the color ink cartridge to be replaced at arbitrary timings.

In the color ink cartridge, at least two inks having an identical hue but different densities are arranged adjacent to each other. In accordance with a concrete structure, cyan ink, ink having a lower dye density than the cyan ink, magenta ink, ink having a lower dye density than the magenta ink, and yellow ink are arranged in this sequence in the color ink cartridge.

The present invention also provides a first method of controlling a head, from which at least two inks of different densities are dischargeable, and regulating a distribution of dots by the at least two inks of different densities based on tone signals of an original image to be printed, so as to record a multi-tone image. The first method includes the steps of:

storing a recording characteristic that starts formation of dots by a higher-density ink in a range of tone signals lower than a specific tone signal which gives a maximum recording density of dots by a lower-density ink;

inputting the tone signals of the original image to be printed;

specifying existence and non-existence of dots by the at least two inks of different densities according to the input tone signals, based on the recording characteristic; and regulating discharge of each ink from the head, so as to realize a tone expression according to the existence and non-existence of dots by the at least two inks of different densities.

The present invention is also directed to a second method of controlling a head, from which at least two inks of different densities are dischargeable, and regulating a distribution of dots by the at least two inks of different densities based on tone signals of an original image to be printed, so as to record a multi-tone image. The second method includes the steps of:

storing a recording characteristic that abruptly decreases a recording density of dots by a lower-density ink in a range of tone signals higher than a specific tone signal which gives a maximum recording density of dots by the lower-density ink;

inputting the tone signals of the original image to be printed;

specifying existence and non-existence of dots by the at least two inks of different densities according to the input tone signals, based on the recording characteristic; and regulating discharge of each ink from the head, so as to realize a tone expression according to the existence and non-existence of dots by the at least two inks of different densities.

The present invention is further directed to a third method of regulating a distribution of dots formed by a plurality of color inks having different hues to record an image. The third method includes the steps of:

providing a head for discharging the plurality of color inks having different hues as well as at least two inks of different densities with respect to one of the plurality of color inks having different hues;

inputting tone signals of an original image to be printed;

specifying recording densities of dots by the plurality of color inks having different hues based on the input tone signals, and determining a recording density of dots formed in a target pixel by a low-density ink among the at least two inks of different densities, in connection with a density of another color ink discharged to the target pixel; and regulating discharge of each ink from the head, so as to record the dots by the plurality of color inks having different hues as well as deep dots and light dots by the at least two inks of different densities on a recording medium.

The present invention provides a first computer program product for driving a head, from which at least two inks of different densities are dischargeable, and regulating a distribution of dots by the at least two inks of different densities based on tone signals of an original image to be printed, so as to record a multi-tone image. The first computer program product includes:

a computer readable medium; and computer program code means stored on the computer readable medium, the computer program code means including:

a table for storing a characteristic that starts formation of dots by a higher-density ink in a range of tone signals lower than a specific tone signal which gives a maximum recording density of dots by a lower-density ink;

first program code means for causing a computer to input the tone signals of the original image to be printed;

second program code means for causing the computer to specify existence and non-existence of dots by the at least two inks of different densities according to the input tone signals, based on the stored characteristic; and third program code means for causing the computer to regulate discharge of each ink from the head, so as to realize a tone expression according to the existence and non-existence of dots by the at least two inks of different densities.

The present invention is also directed to a second computer program product for driving a head, from which at least two inks of different densities are dischargeable, and regulating a distribution of dots by the at least two inks of different densities based on tone signals of an original image to be printed, so as to record a multi-tone image. The second computer program product includes:

a computer readable medium; and computer program code means stored on the computer readable medium, the computer program code means including:

a table for storing a characteristic that abruptly decreases a recording density of dots by a lower-density ink in a range of tone signals higher than a specific tone signal which gives a maximum recording density of dots by the lower-density ink;

first program code means for causing a computer to input the tone signals of the original image to be printed;

second program code means for causing the computer to specify existence and non-existence of dots by the at least two inks of different densities according to the input tone signals, based on the stored characteristic; and third program code means for causing the computer to regulate discharge of each ink from the head, so as to realize a tone expression according to the existence and non-existence of dots by the at least two inks of different densities.

The present invention is further directed to a third computer program product for driving a head, from which a plurality of color inks having different hues as well as at least two inks of different densities with respect to one of the plurality of color inks having different hues are dischargeable, and regulating a distribution of dots formed by the plurality of color inks having different hues, so as to record an image. The third computer program product includes:

a computer readable medium; and computer program code means stored on the computer readable medium, the computer program code means including:

first program code means for causing a computer to input tone signals of an original image to be printed;

second program code means for causing the computer to specify recording densities of dots by the plurality of color inks having different hues based on the input tone signals, and determine a recording density of dots formed in a target pixel by a low-density ink among the at least two inks of different densities, in connection with a density of another color ink discharged to the target pixel; and third program code means for causing the computer to regulate discharge of each ink from the head, so as to record the dots by the plurality of color inks having different hues as well as deep dots and light dots by the at least two inks of different densities on a recording medium.

The present invention also includes other applications. One possible application is arrangement of the input means and the dot formation means in an output device of an image to be printed, instead of in the casing of a printer. The dot formation means may be realized by a discrete circuit or by software in an arithmetic and logic circuit including a CPU. In the latter case, the output device of an image to be printed, such as a computer, carries out the processing related to formation of dots. Only a mechanism for regulating discharge of inks from the head and recording the dots on a sheet of paper may be arranged in the casing of the printer. In accordance with another possible application, some functions of the dot formation means are realized in the casing of the printer, whereas the other functions are realized in the output device of an image to be printed.

These and other objects, features, aspects, and advantages of the present invention will become more apparent from the following detailed description of the preferred embodiments with the accompanying drawings.

BRIEF DESCRIPTION OF THE DRAWINGS

FIG. 6 is a perspective view showing a color ink cartridge 70a;

FIG. 10 shows compositions of color inks used in the first embodiment;

FIGS. 21A and 22B are graphs showing recording ratios of light magenta ink and magenta ink, which are used in the second embodiment;

DESCRIPTION OF THE PREFERRED EMBODIMENTS

Figure 1:
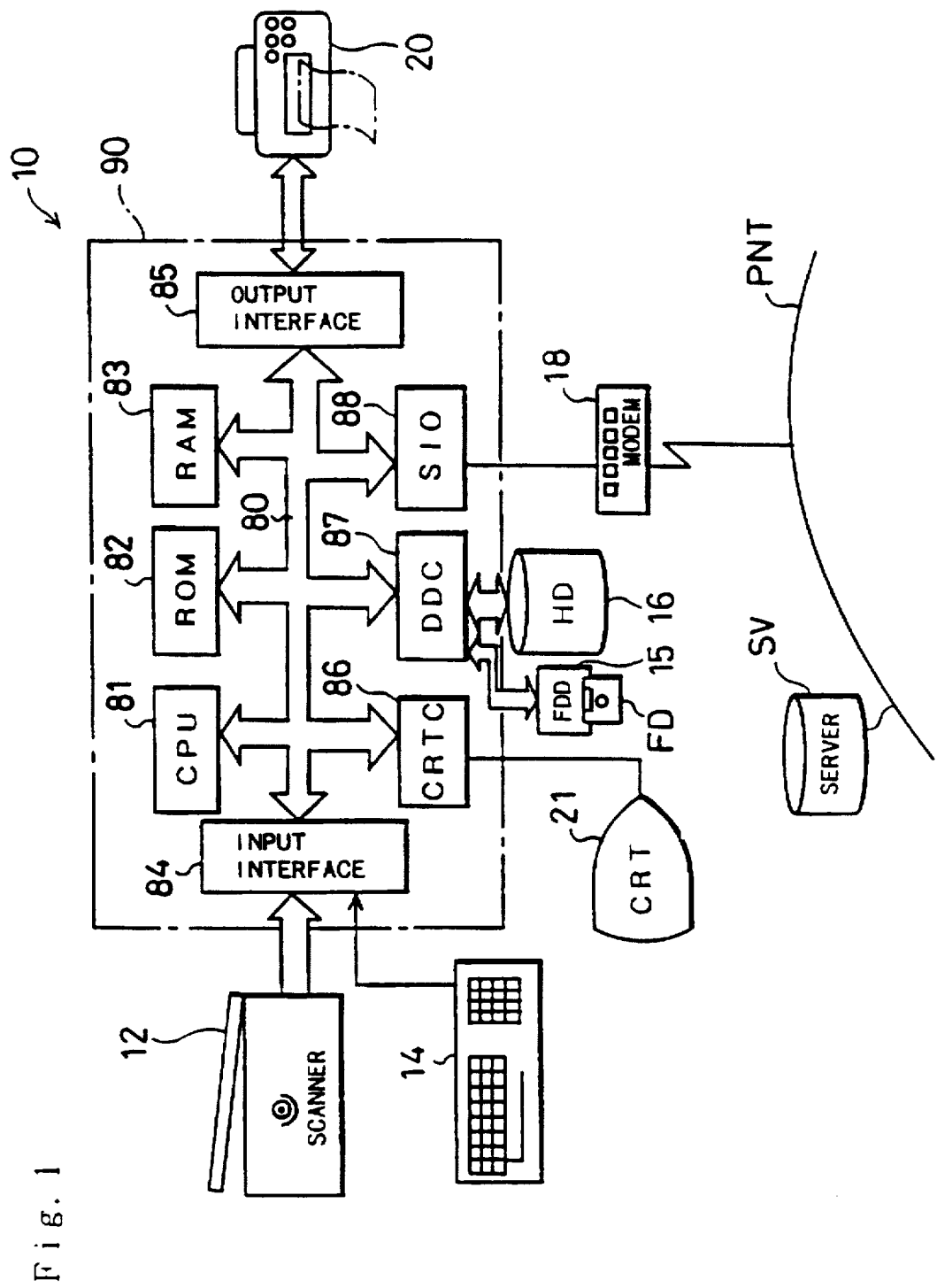
FIG. 1 is a block diagram schematically illustrating structure of a printing system 10 as a first embodiment according to the present invention.

Some modes of carrying out the present invention are described below as preferred embodiments. Referring to FIG. 1, a printing system 10 embodying the present invention includes a computer 90 and a printer 20 connected thereto. A scanner 12 is further connected with the computer 90. The computer 90 executes predetermined programs loaded therein, so as to realize the printing system 10 with an image scanning function. The computer 90 includes a CPU 81 for executing a variety of arithmetic and logic operations according to programs in order to control the actions related to image processing, and other peripheral units mutually connected to one another via a bus 80. A ROM 82 stores programs and data required for execution of the variety of arithmetic and logic operations by the CPU 81.

A RAM 83 is a memory, which various programs and data required for execution of the variety of arithmetic and logic operations by the CPU 81 are temporarily read from and written in. An input interface 84 receives input signals from the scanner 12 and a keyboard 14, whereas an output interface 85 sends output data to the printer 20. A CRTC 86 controls signal outputs to a CRT 21 that can display color images. A disk controller (DDC) 87 controls transmission of data from and to a hard disk 16, a flexible drive 15, and a CD-ROM drive (not shown). The hard disk 16 stores a variety of programs that are loaded into the RAM 83 and executed, as well as other programs that are supplied in the form of a device driver. A serial input-output interface (SIO) 88 is also connected to the bus 80. The SIO 88 is connected to a public telephone network PNT via a modem 18. The computer 90 is connected with an external network via the SIO 88 and the modem 18, and can access a specific server SV in order to download the programs required for image processing into the hand disk 76. The computer 90 may alternatively execute the required programs loaded from a flexible disk FD or a CD-ROM.

Figure 2:
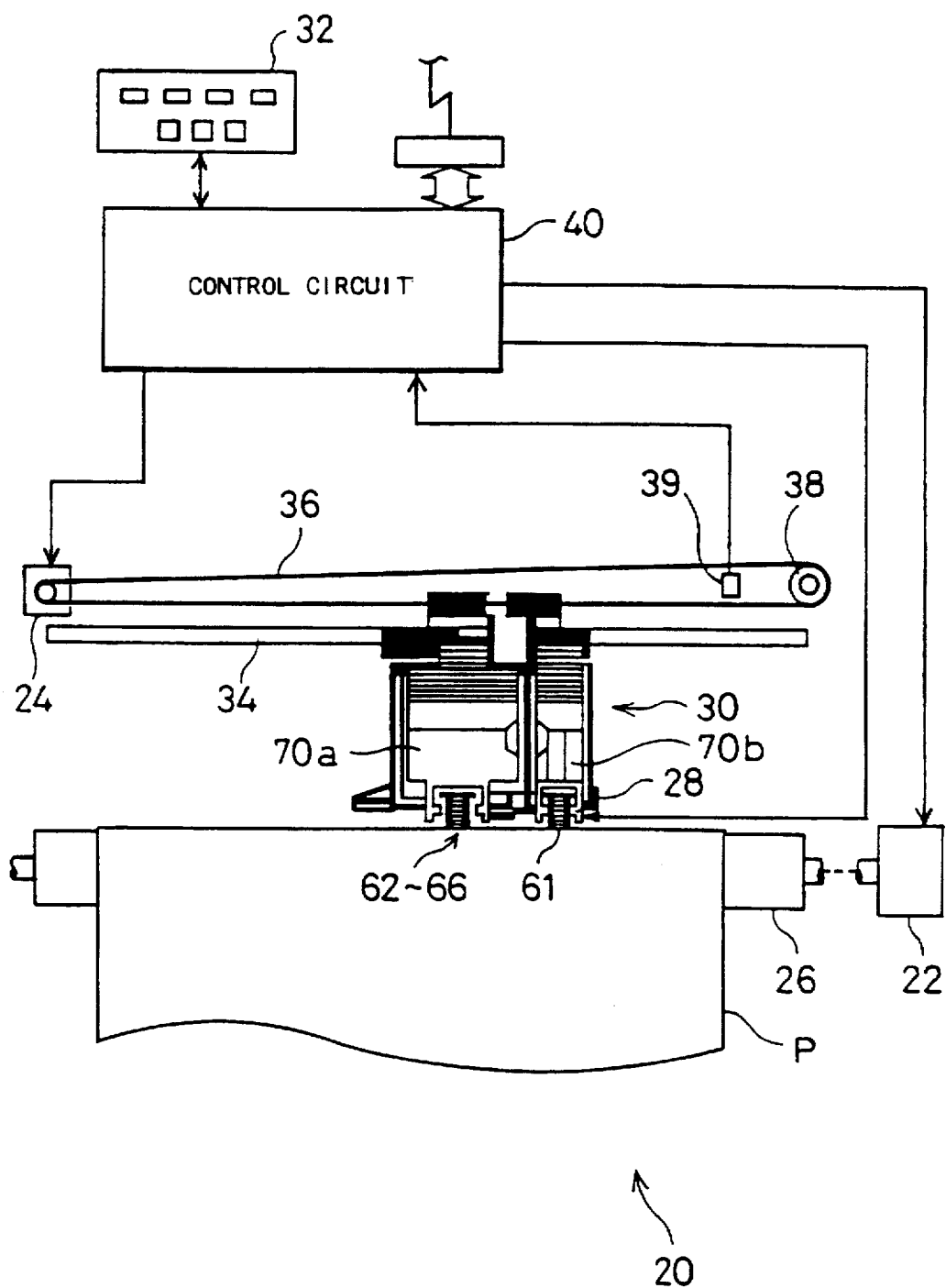
FIG. 2 schematically illustrates structure of a printer 20 used in the first embodiment.

Referring to FIG. 2, the printer 20 has a mechanism for feeding a sheet of paper P by means of a sheet feed motor 22, a mechanism for reciprocating a carriage 30 along the axis of a platen 26 by means of a carriage motor 24, a mechanism for driving a print head 28 mounted on the carriage 30 to control discharge of ink and production of dot patterns, and a control circuit 40 for transmitting signals to and from the sheet feed motor 22, the carriage motor 24, the print head 28, and a control panel 32.

The mechanism for feeding the sheet of paper P has a gear train (not shown) for transmitting rotations of the sheet feed motor 22 to the platen 26 as well as a sheet feed roller (not shown). The mechanism for reciprocating the carriage 30 includes a sliding shaft 34 arranged in parallel with the axis of the platen 26 for slidably supporting the carriage 30, a pulley 38, an endless drive belt 36 spanned between the carriage motor 24 and the pulley 38, and a position sensor 39 for detecting the position of the origin of the carriage 30.

Figure 3:
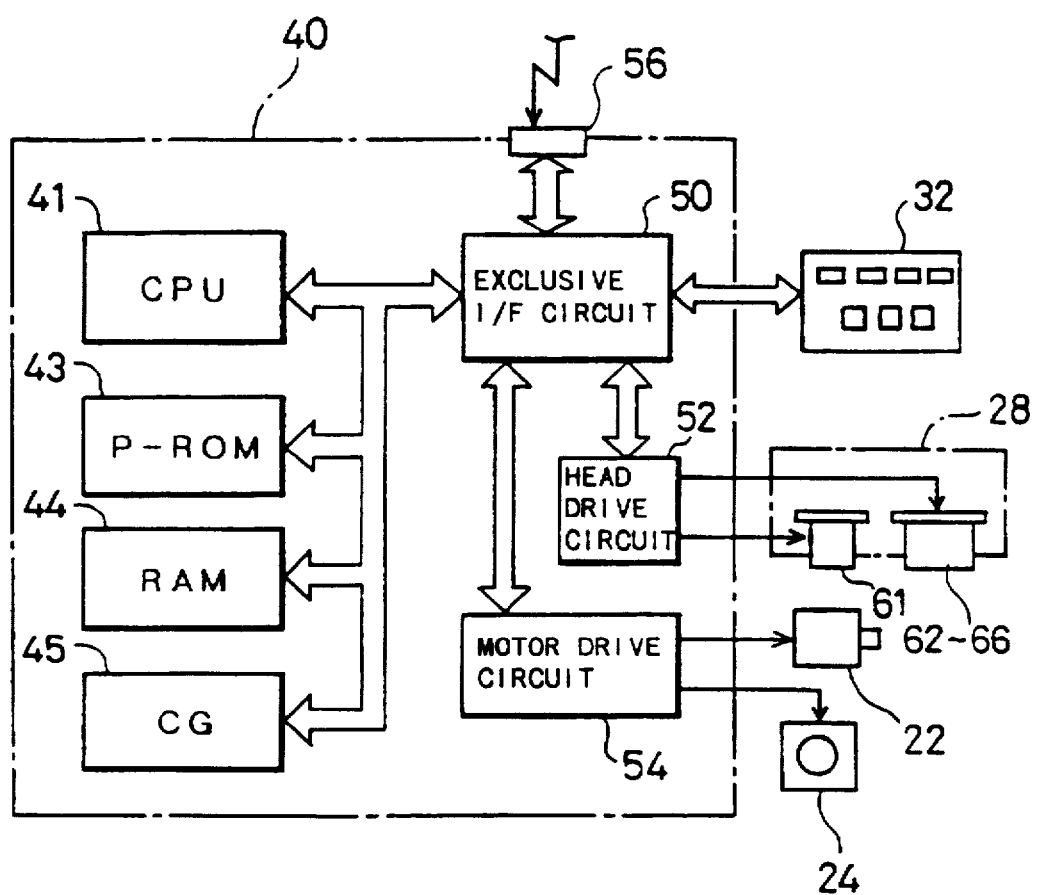
FIG. 3 is a block diagram showing structure of a control circuit 40 included in the printer 20.

Structure of the control circuit 40 and peripheral units included in the printer 20 is discussed below with the block diagram of FIG. 3. Referring to FIG. 3, the control circuit 40 is constructed as a known arithmetic and logic operation circuit including a CPU 41, a P-ROM 43 for storing programs, a RAM 44, and a character generator (CG) 45 for storing dot matrices of characters. The control circuit 40 further includes an exclusive I/F circuit 50 exclusively working as an interface to an external motor and the like, a head drive circuit 52 connected with the exclusive I/F circuit 50 for driving the print head 28, and a motor drive circuit 54 connected with the exclusive I/F circuit 50 for driving the sheet feed motor 22 and the carriage motor 24. The exclusive I/F circuit 50 includes a parallel interface circuit and is connected to a computer via a connector 56 to receive printing signals output from the computer. Output of image signals from the computer will be discussed later.

Figure 4:
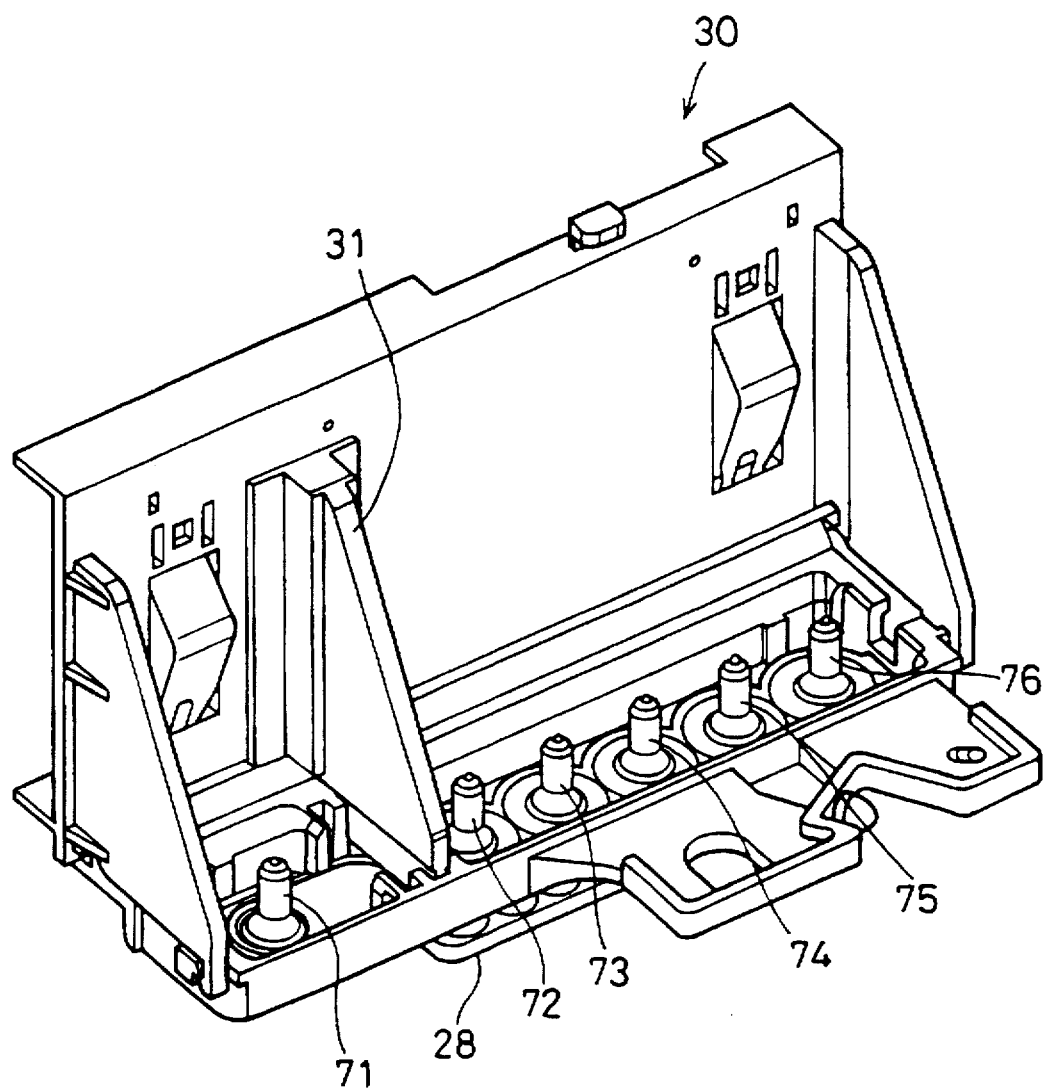
FIG. 4 is a perspective view illustrating structure of a carriage 30 included in the printer 20.
Figure 5:
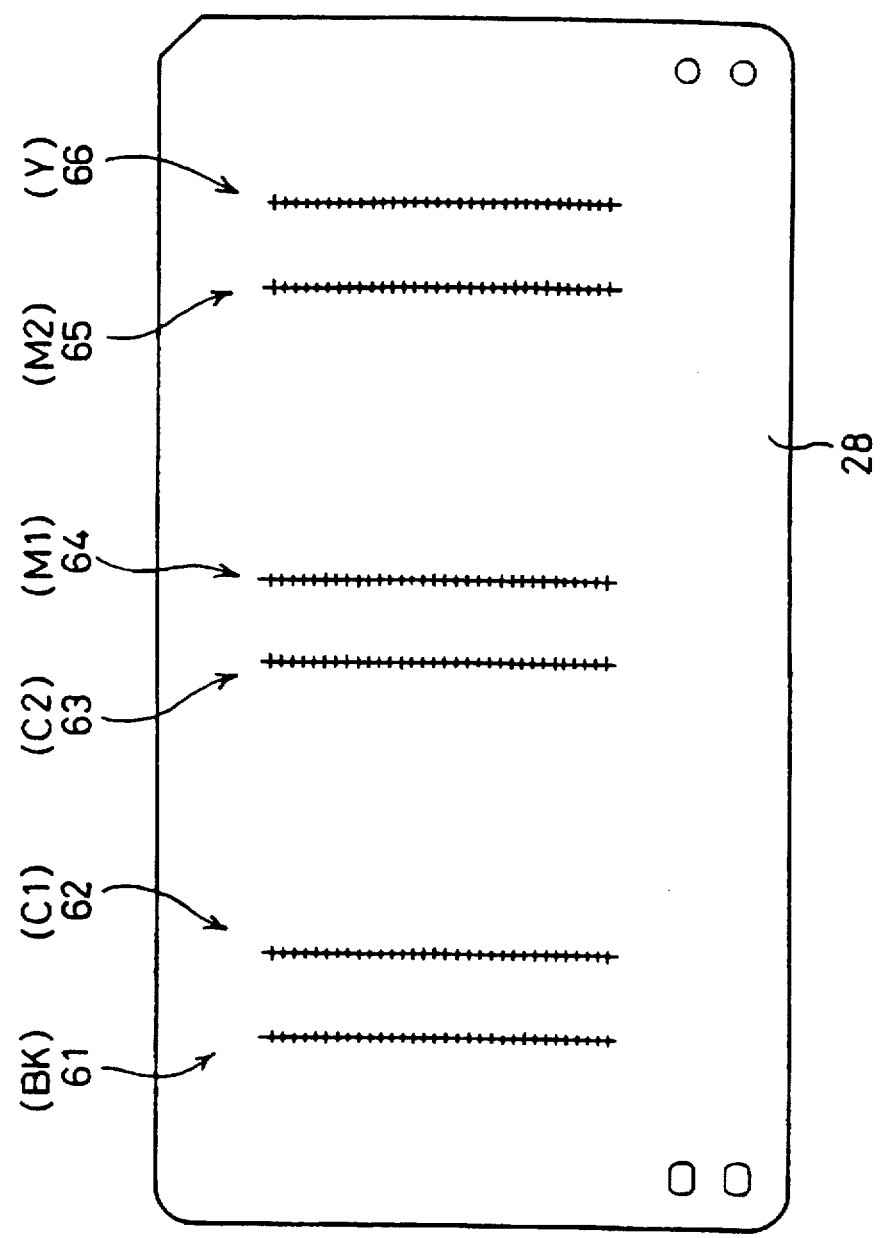
FIG. 5 shows an arrangement of color heads 61 through 66 in a print head 28.
Figure 6:
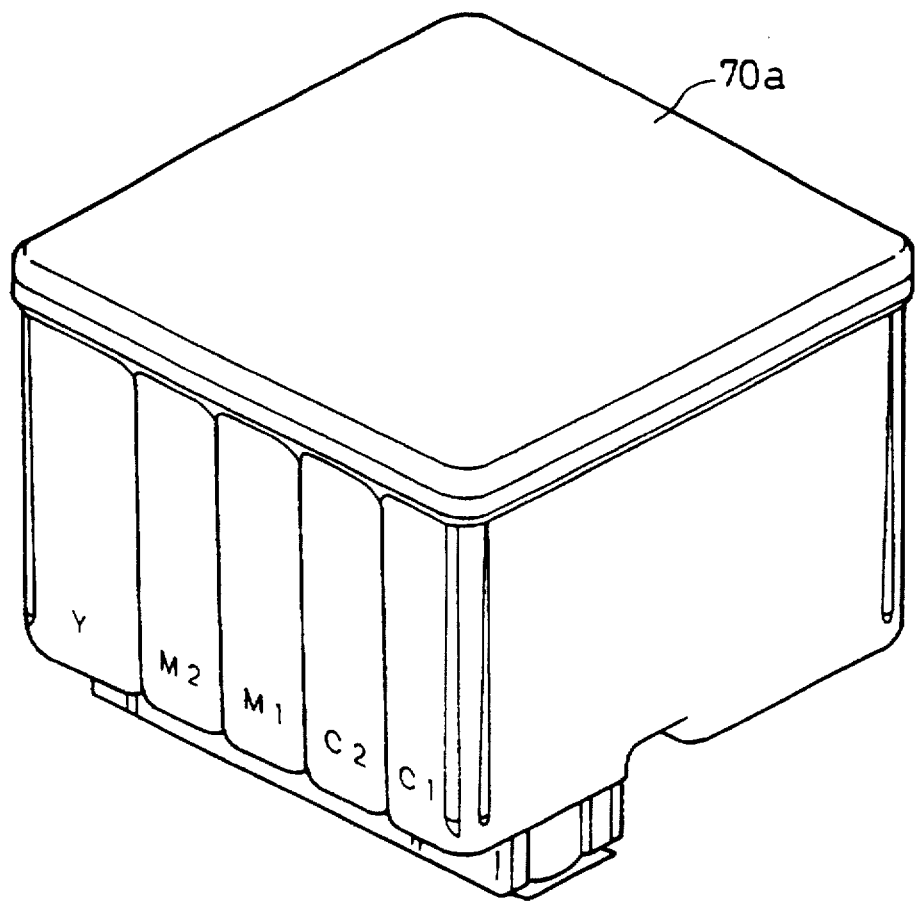

The following describes a concrete structure of the carriage 30 and the principle of discharging ink by the print head 28 mounted on the carriage 30. A color ink cartridge 70a and a black ink cartridge 70b (see FIG. 2) are attachable to the substantially L-shaped carriage 30 shown in FIG. 4. Detailed structure of the color ink cartridge 70a is shown in FIG. 6. A partition wall 31 separates the black ink cartridge 70b from the color ink cartridge 70a. Referring to FIG. 5, six color heads 61 through 66 for respectively discharging color inks are formed in the print head 28 that is disposed on the lower portion of the carriage 30. Ink supply pipes 71 through 76 for leading inks from ink tanks to the respective color heads 61 through 66 are formed upright on the bottom of the carriage 30 as shown in FIG. 4. When the color ink cartridge 70a and the black ink cartridge 70b are attached downward to the carriage 30, the ink supply pipes 71 through 76 are inserted into connection holes formed in the respective cartridges 70a and 70b.

Figure 7:
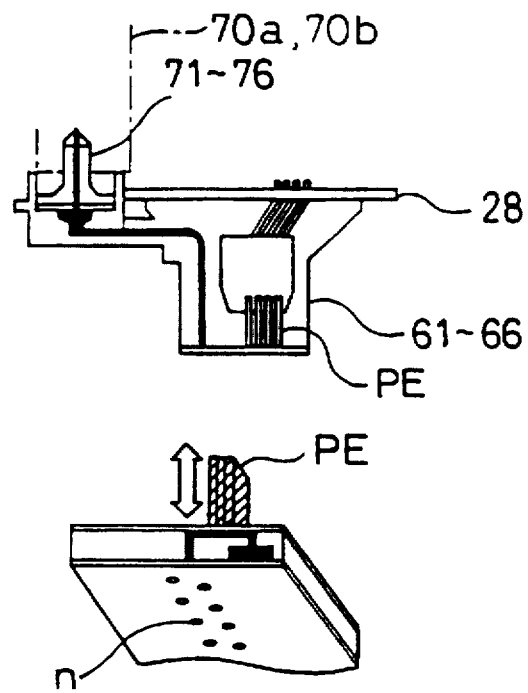
FIG. 7 shows a mechanism of ink discharge in each of the color heads 61 through 66.
Figure 8A:
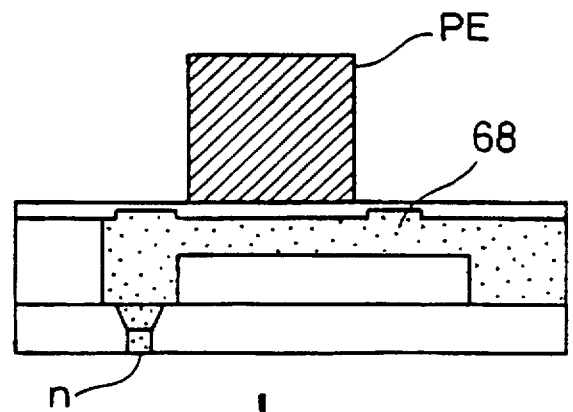
FIGS. 8A and 8B show a process of discharging ink particles Ip by extension of a piezoelectric element PE.
Figure 8B:
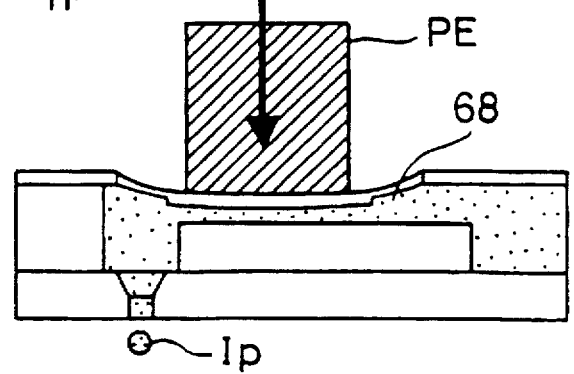

When the ink cartridge 70 (including the color ink cartridge 70a and the black ink cartridge 70b) is attached to the carriage 30, inks in the ink cartridge 70 are sucked out by a capillarity through the ink supply pipes 71 through 76 and are led to the color heads 61 through 66 formed in the print head 28 arranged on the lower portion of the carriage 30 as shown in FIG. 7. A row of nozzles 'n' are formed in each of the color heads 61 through 66 as shown in FIGS. 5 and 7. In this embodiment, the number of nozzles for each color head is 32. A piezoelectric element PE is arranged for each row of nozzles 'n'. As is known, the piezoelectric element PE has a crystal structure undergoing mechanical stress by application of a voltage and thereby carries out extremely high-speed conversion of electrical energy to mechanical energy. FIGS. 8A and 8B illustrate configuration of the piezoelectric element PE and the nozzles 'n'. The piezoelectric element PE is disposed at a position that comes into contact with an ink conduit 68 for leading ink to the nozzles 'n'. In this embodiment, application of a voltage between electrodes on either ends of the piezoelectric element PE for a predetermined time period causes the piezoelectric element PE to abruptly extend and deform one side wall of the ink conduit 68 as shown in FIG. 8B. The volume of the ink conduit 68 is reduced with an extension of the piezoelectric element PE, and a certain amount of ink corresponding to the volume reduction is discharged as ink particles Ip from the ends of the nozzles 'n' with a high speed. The ink particles Ip soak into the sheet of paper P set on the platen 26, so as to print images.

In order to ensure spaces for the piezoelectric elements PE, the six color heads 61 through 66 are divided into three pairs on the print head 28 as shown in FIG. 5. The first pair includes the black ink head 61 that is arranged at one end close to the black ink cartridge 70b and the cyan ink head 62 that is disposed next to the black ink head 61. The second pair includes the head 63 for lower-density cyan ink compared with the standard cyan ink supplied to the cyan ink head 62 (hereinafter referred to as light cyan ink) and the magenta ink head 64. The third pair includes the head 65 for lower-density magenta ink compared with the standard magenta ink supplied to the magenta ink head 64 (hereinafter referred to as light magenta ink) and the yellow ink head 66. The compositions and densities of the respective inks will be discussed later.

Figure 9:
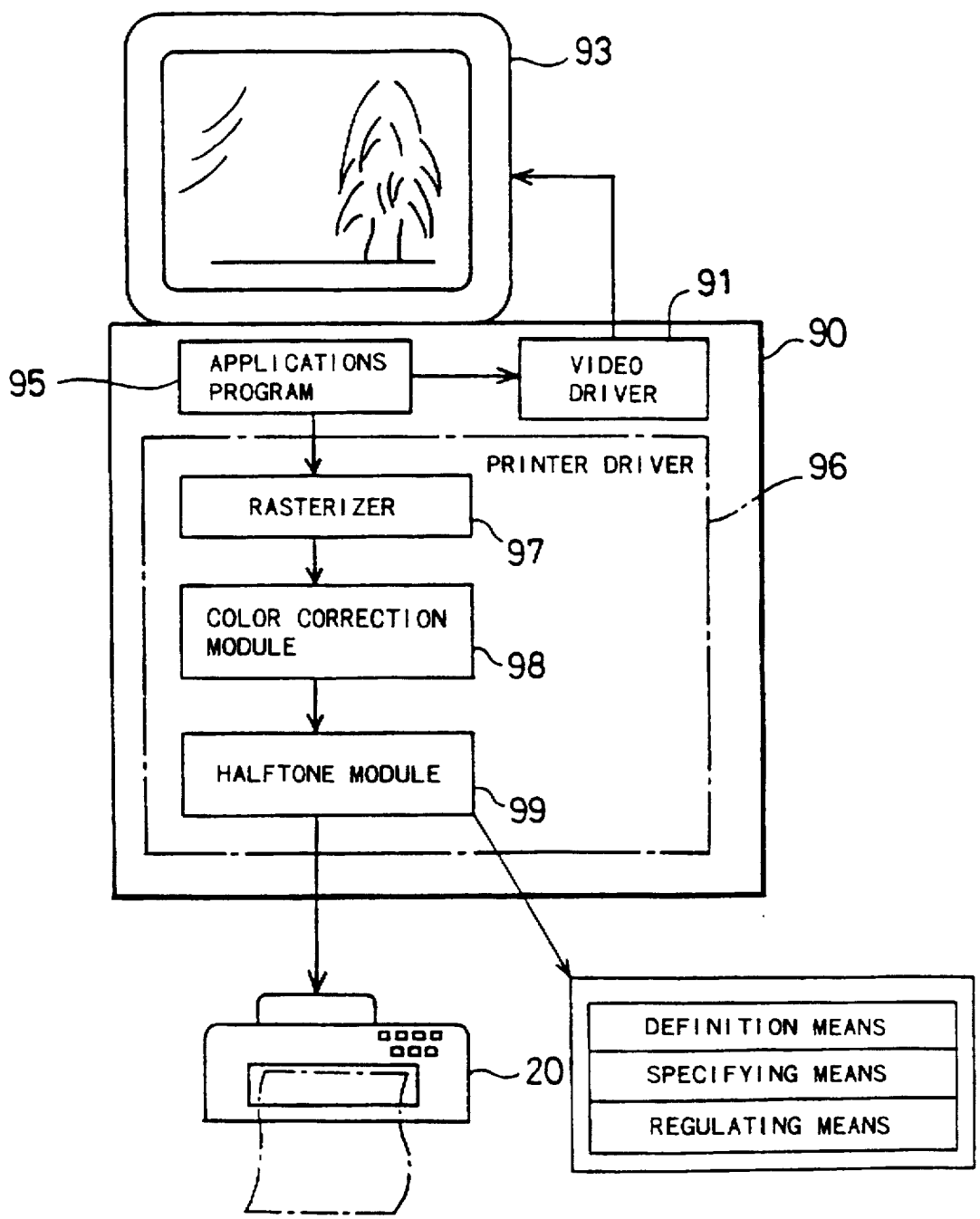
FIG. 9 is a block diagram showing a series of processes that enable a computer 90 to print images based on image information.

In the printer 20 of the embodiment having the hardware structure discussed above, while the sheet feed motor 22 rotates the platen 26 and the other rollers to feed the sheet of paper P, the carriage 30 is driven and reciprocated by the carriage motor 24 and the piezoelectric elements PE on the respective color heads 61 through 66 of the print head 28 are driven simultaneously. The printer 20 accordingly discharges the respective color inks and transfers multi-color images onto the sheet of paper P. Referring to FIG. 9, the printer 20 prints multi-color images based on signals output from an image production apparatus, such as the computer 90, via the connector 56. In this embodiment, an applications program 95 working in the computer 90 processes images and displays the processed images on a CRT display 93 via a video driver 91. When the applications program 95 outputs a printing instruction, a printer driver 96 in the computer 90 receives image information from the applications program 95 and the printer 20 converts the image information to printable signals. In the example of FIG. 9, the printer driver 96 includes a rasterizer 97 for converting the image information processed by the applications program 95 to dot-based color information, a color correction module 98 for making the image information that has been converted to the dot-based color information (tone data) undergo color correction according to the calorimetric characteristics of an image output apparatus, such as the printer 20, and a halftone module 99 for generating halftone image information, which expresses densities in a specified area by the existence or non-existence of ink in each dot unit, from the color-corrected image information. Operations of these modules are known to the skilled in the art and are thus not specifically described here in principle. The contents of the halftone module 99 may, however, be described according to the requirements.

As discussed above, the printer 20 of the embodiment has the additional heads 63 and 65 for light cyan ink and light magenta ink other than the four heads 61, 62, 64, and 66 for the standard four color inks K, C, M, and Y in the print head 28. As shown in FIG. 10, light cyan ink and light magenta ink have lower dye densities than those of standard cyan ink and magenta ink. Cyan ink of standard density (defined as C1 in FIG. 10) includes 3.6% by weight of Direct blue 99 as a dye, 30% by weight of diethylene glycol, 1% by weight of Surfinol 465, and 65.4% by weight of water. Light cyan ink (defined as C2 in FIG. 10), on the other hand, includes only 0.9% by weight of Direct blue 99, that is, one quarter the dye density of the cyan ink C1, and 35% by weight of diethylene glycol and 63.1% by weight of water for adjustment of the viscosity. Magenta ink of standard density (defined as M1 in FIG. 10) includes 2.8% by weight of Acid red 289 as a dye, 20% by weight of diethylene glycol, 1% by weight of Surfinol 465, and 79% by weight of water. Light magenta ink (defined as M2 in FIG. 10), on the other hand, includes only 0.7% by weight of Acid red 289, that is, one quarter the dye density of the magenta ink M1, and 25% by weight of diethylene glycol and 74% by weight of water for adjustment of the viscosity.

Yellow ink Y includes 1.8% by weight of Direct Yellow 86 as a dye, whereas black ink K includes 4.8% by weight of Food black 2 as a dye. All these inks are adjusted to have the viscosity of approximately 3 [mPa·s]. Adjustment of the viscosity to the substantially identical level enables identical control of the piezoelectric elements PE for the respective color heads 61 through 66.

Figure 11:
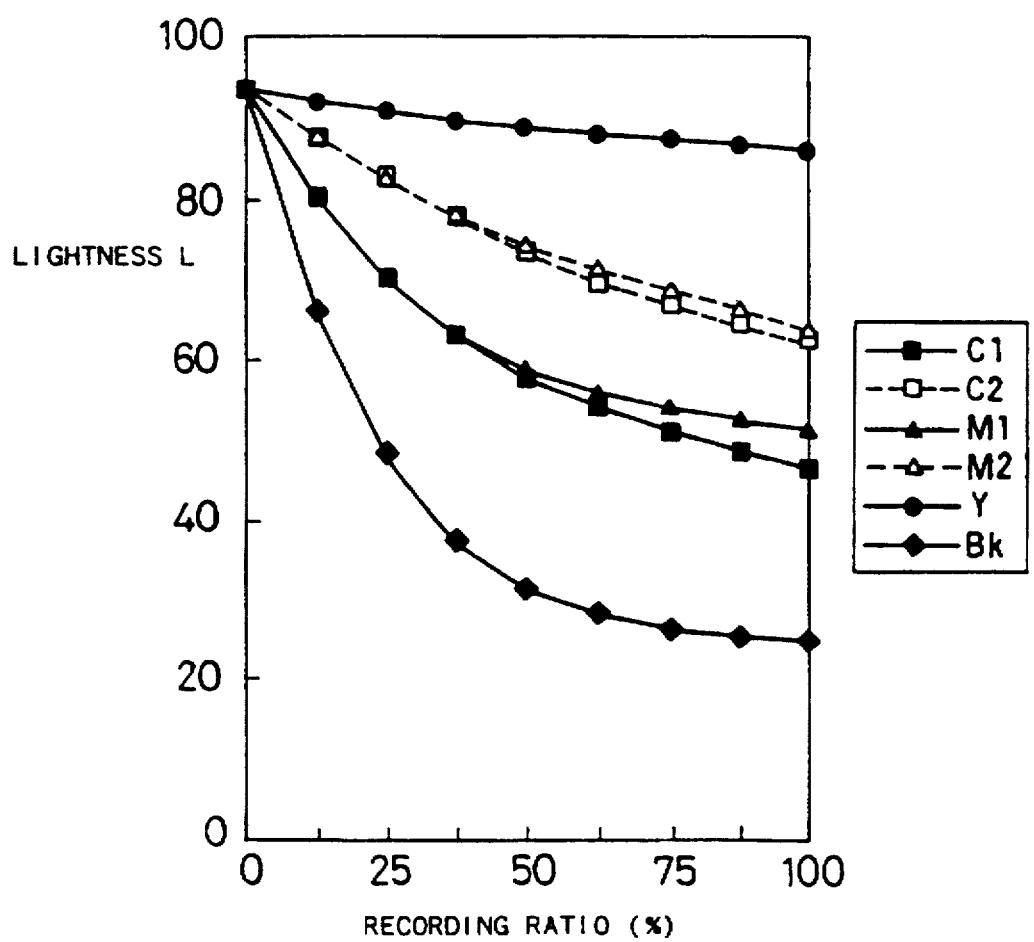
FIG. 11 is a graph showing the lightness plotted against the recording ratio of each color ink.

FIG. 11 is a graph showing the lightness of these color inks. The abscissa of FIG. 11 denotes the recording ratio to the recording resolution of the printer, that is, the proportion of printing dots formed by the ink particles Ip discharged from the nozzles 'n' to the white sheet of paper P. The recording ratio=100 represents the state, in which the whole surface of the sheet of paper P is covered with the ink particles Ip. In this embodiment, the light cyan ink C2 has approximately one quarter the dye density (percent by weight) of the cyan ink C1. The lightness of the light cyan ink C2 at the recording ratio of 100% is equal to the lightness of the cyan ink C1 at the recording ratio of approximately 35%. This relationship is also applicable to the lightness of the magenta ink M1 and the light magenta ink M2. The proportion of recording ratios of different-density inks giving the identical lightness is defined by the beauty of color mixture in case that the two different-density inks are mixed in print. In practice, it is desirable to adjust the proportion in the range of 20% to 50%. This relationship is substantially equivalent to the adjustment of the dye density (percent by weight) of the lower-density ink (light cyan ink C2 or the light magenta ink M2) to almost one fifth to one third the dye density (percent by weight) of the higher-density ink (cyan ink C1 or the magenta ink M1).

Figure 12:
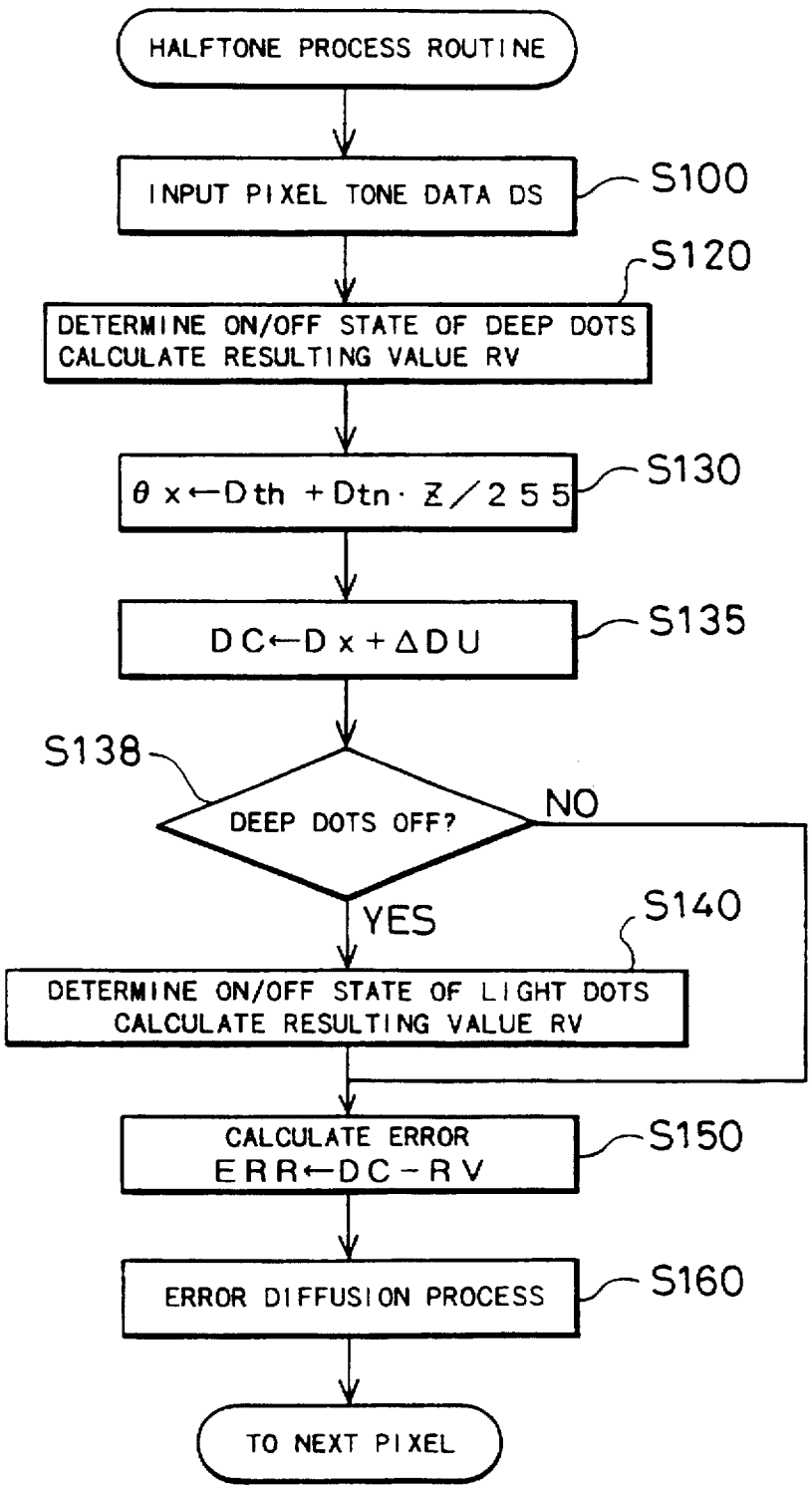
FIG. 12 is a flowchart showing a processing routine executed in a halftone module 99.

The printer 20 of the embodiment carries out the processing in the halftone module 99 of the printer driver 96 and thereby prints images with high-density ink and low-density ink. FIG. 12 is a flowchart showing a halftone process routine carried out in the halftone module 99.

As a printing process starts, pixels are successively scanned from the upper left corner of one image set as the origin. The halftone module 99 receives color-corrected tone data DS (8 bits respectively for C, M, Y, and K) of one pixel in the order along the scanning direction of the carriage 30 from the color correction module 98 at step S100.

The following description is on the assumption that images are printed only in cyan ink. In the actual state, however, images are printed in multiple colors; deep dots and light dots of magenta are formed by the higher-density magenta ink M1 and the lower-density light magenta ink M2, whereas dots of yellow and dots of black are respectively formed by the yellow ink Y and the black ink K. In case that dots are formed by different color inks in a predetermined area, required control is carried out to realize the favorable color reproduction by color mixture. For example, the control procedure does not allow dots of different colors to be printed at the same position.

The program then proceeds to step S120 to determine the on/off state of deep dots, based on the input tone data DS. The process of determining the on/off state of deep dots follows a routine of determining formation of deep dots shown in the flowchart of FIG. 13. When the program enters the routine of FIG. 13, deep level data Dth is read from a table shown in FIG. 14, based on the input tone data DS at step S122. FIG. 14 is a table showing the recording ratios of the light ink and deep ink plotted against the tone data of the original image. The tone data DS take the values of 0 to 255 for each color (8 bit-data for each color), and the magnitude of the tone data is accordingly expressed as 16/256 in the following description. The table of FIG. 14 shows the mean ratio of deep ink to light ink in a resulting print and gives mean recording ratios of deep ink and light ink to be realized for a specific piece of tone data DS. This does not unequivocally determine the on/off state of dots by deep ink or light ink in the respective pixels.

At step S122, deep level data Dth (right ordinate in FIG. 14) corresponding to a predetermined recording ratio of deep ink is read from the table of FIG. 14, based on the input tone data DS. For example, in case that the input tone data of cyan represents a solid area of 50/256, the recording ratio of the deep cyan ink C1 is equal to 0%, so that the value of deep level data Dth is equal to zero. In case that the input tone data represents a solid area of 95/256, the recording ratio of the deep cyan ink C1 is equal to 7%, so that the value of deep level data Dth is equal to 18. In case that the input tone data represents a solid area of 191/256, the recording ratio of the deep cyan ink C1 is equal to 75%, so that the value of deep level data Dth is equal to 191. The corresponding recording ratios of the light cyan ink C2 are 36%, 58%, and 0%, respectively, and light level data Dtn are 92/255, 148/255, and 0/255.

The relationship between the recording ratio of the light cyan ink C2 and the recording ratio of the cyan ink C1 shown in the table of FIG. 14 has the following characteristics:

(1) Only the light cyan ink C2 is recorded in the range of low tone data (the range of 0/256 to 63/256 in this example). In this range, the recording ratio of the light cyan ink C2 monotonously increases with an increase in magnitude of tone data.

(2) Before the recording ratio of the light cyan ink C2 increasing with an increase in input tone data reaches its maximum (58% in this example), formation of dots by the higher-density cyan ink C1 starts and increases with the increase in tone data. In this example, formation of dots by the cyan ink C1 starts when the value of input tone data exceeds 63/256. The specific value of tone data giving the maximum recording ratio of the light cyan ink is 95/256 in this example.

(3) When the tone data exceeds the specific value that gives the maximum recording ratio of the light cyan ink C2, the recording ratio of the light cyan ink C2 starts decreasing. The recording ratio of the cyan ink C1, on the other hand, increases substantially in proportion to an increase in tone data. In this example, the recording ratio of the light cyan ink C2 decreases abruptly in the range of tone data exceeding 127/256, and is substantially equal to zero in the range of tone data exceeding 191/256.

(4) In the range of tone data greater than the value, at which the recording ratio of the light cyan ink C2 becomes substantially equal to zero, the recording ratio of the cyan ink C1 gradually increases to the maximum 100% with an increase in tone data. Compared with the previous range, however, the increase in recording ratio against the increase in tone data shows a slightly gentle slope in this range.

Figure 13:
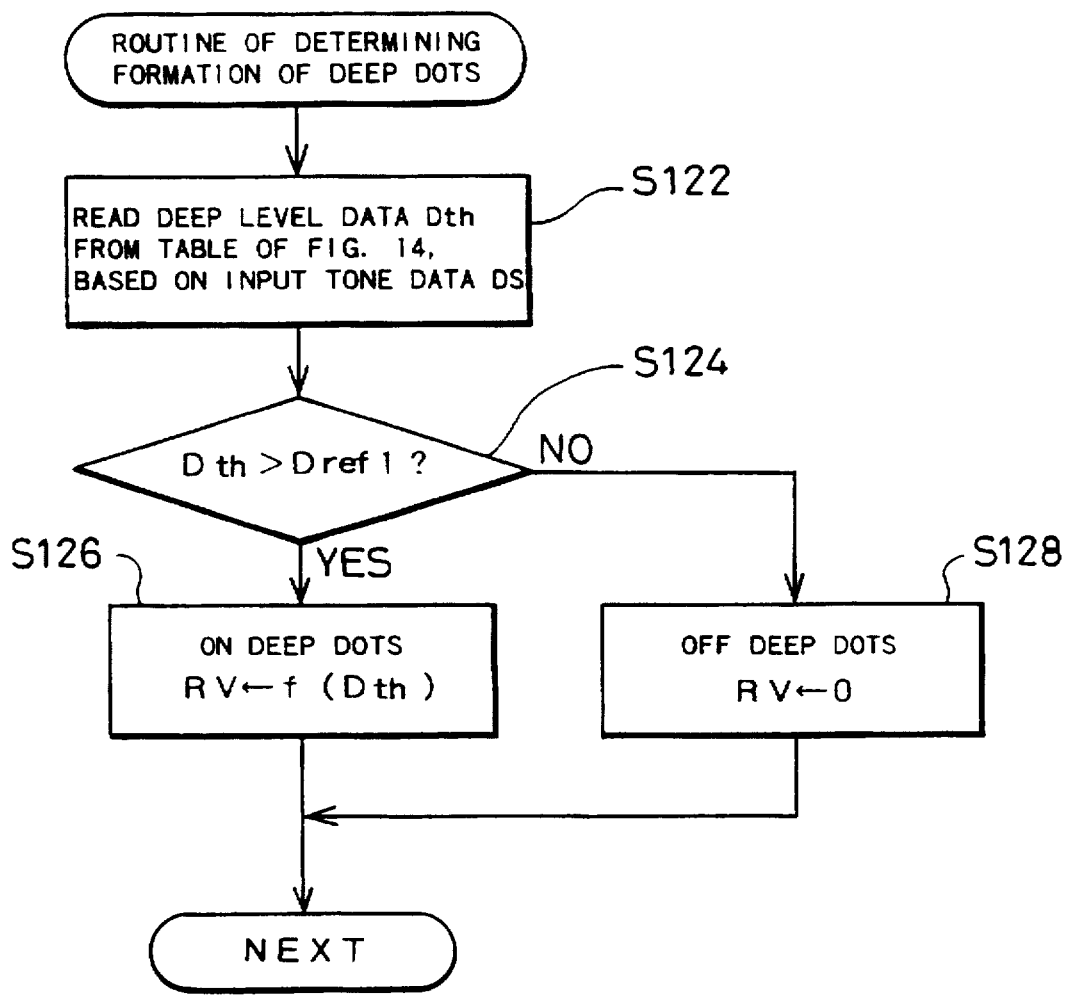
FIG. 13 is a flowchart showing a routine of determining formation of deep dots.
Figure 14:
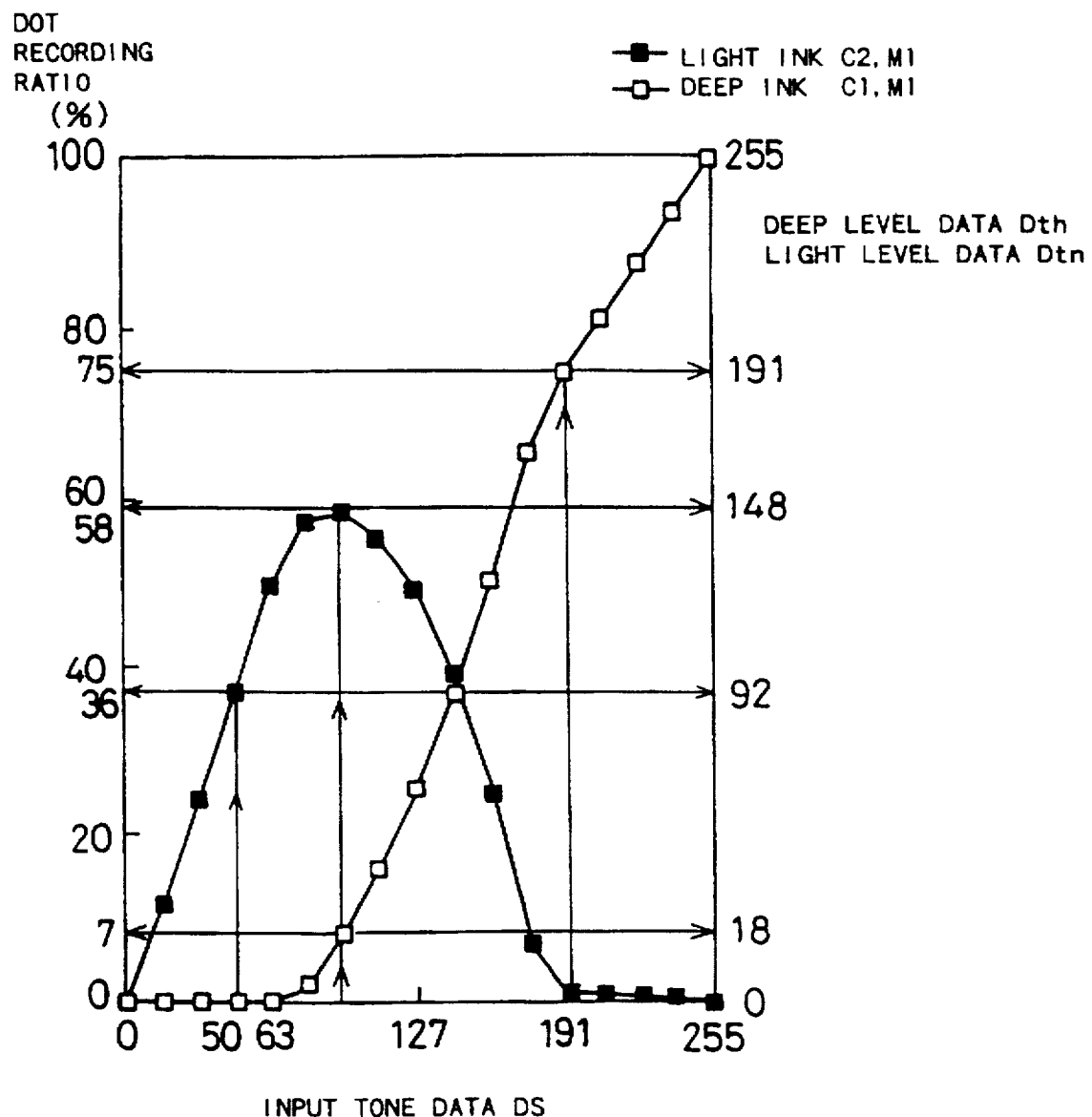
FIG. 14 is a table showing the relationship between tone data and recording ratios of light ink and deep ink, which is used in the first embodiment.
Figure 15:
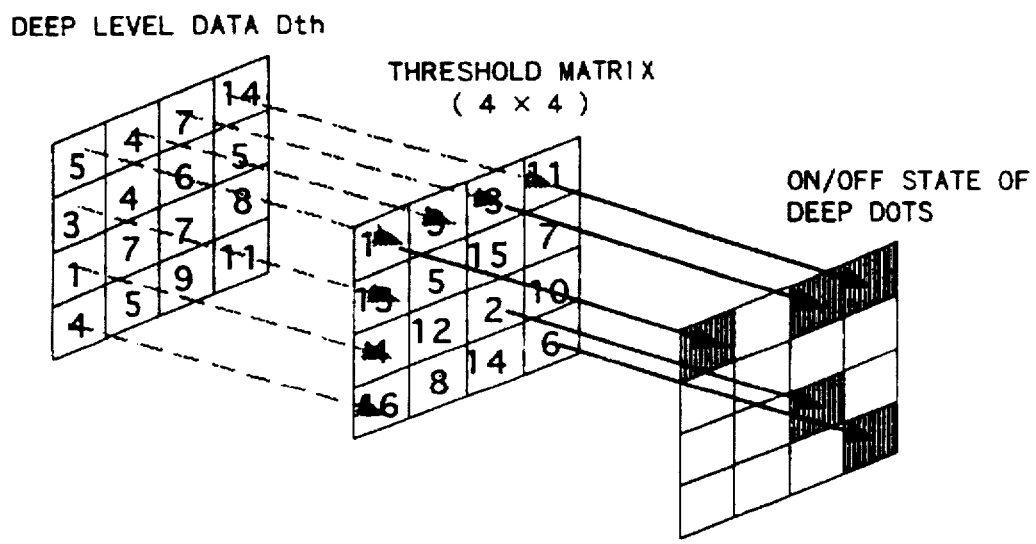
FIG. 15 shows a threshold matrix of discrete dither used for determining the on/off state of deep dots.

The procedure of this embodiment obtains the deep level data Dth according to the relationship shown in the table of FIG. 14 and carries out the following process to determine the on/off state of a deep ink dot. Referring back to the flowchart of FIG. 13, the deep level data Dth thus obtained is compared with a threshold value Dref1 at step S124. The threshold value Dref1 is a reference value for determining whether or not dots of deep ink should be formed in a target pixel. In this embodiment, systematic dither method using a threshold matrix of discrete dither is applied to set the threshold value. The threshold matrix of discrete dither used here is, for example, a wide-range matrix of 64×64 in size (blue noise matrix). Different threshold values Dref1 used for determining the on/off state of deep dots are accordingly set for the respective target pixels. FIG. 15 shows the principle of the systematic dither method. Although the matrix shown in FIG. 15 has the size of 4×4 as a matter of convenience of illustration, the matrix actually used has the size of 64×64. Threshold values (0 to 255) are specified to have no bias in appearance of threshold values in any areas included in the 64×64 matrix. The wide-range matrix effectively prevents occurrence of pseudo-contours. The discrete dither ensures high spatial frequencies of dots determined by the threshold matrix and makes dots sufficiently scattered in the specified area. A concrete example of the discrete dither is a Beyer's threshold matrix. Application of the discrete dither causes deep dots to be sufficiently scattered and realizes a non-biased distribution of deep dots and light dots, thereby improving the picture quality. Another technique, for example, density pattern method or pixel distribution method, may be applied to determine the on/off state of deep dots.

In case that the deep level data Dth is greater than the threshold value Dref1 at step S124 in the flowchart of FIG. 13, the program determines the on state of deep dots in the pixel and calculates a resulting value RV at step S126. The resulting value RV corresponds to the density of the pixel (deep dot evaluation value). In the on state of deep dots, that is, when it is determined that dots of high-density ink are to be formed in the pixel, the value corresponding to the density of the pixel (for example, the value 255) is set as the resulting value RV. The resulting value RV may be a fixed value or set as a function of deep level data Dth.

In case that the deep level data Dth is not greater than the threshold value Dref1 at step S124, on the contrary, the program determines the off state of deep dots, that is, no formation of dots by high-density ink in the pixel, and sets the value '0' to the resulting value RV at step S128. Since the white background of the sheet of paper P remains in the place where no dots of high-density ink are formed, the resulting value RV is set equal to zero.

Referring back to the flowchart of FIG. 12, after determining the on/off state of deep dots and calculating the resulting value RV at step S120, the program proceeds to step S130 to calculate light dot data Dx used for determining the on/off state of light dots. At subsequent step S135, corrected data DC is obtained by adding a diffusion error ΔDu from the processed pixel to the light dot data Dx. The light dot data Dx is calculated at step S130 according to the following equation:

$$Dx=Dth \cdot ZZ/255+Dtn \cdot z/255$$

wherein Dtn denotes light level data read from the table of FIG. 14, based on the tone data DS, and ZZ represents an evaluation value in the case of formation of deep dots and is equal to 255 as mentioned above. The above equation is accordingly rewritten to:

$$Dx=Dth+Dtn \cdot z/255$$

wherein z denotes an evaluation value in the case of formation of light dots. The evaluation value in the case of formation of light dots is smaller than the same in the case of formation of deep dots and is set equal to 160 in this embodiment.

Figure 16:
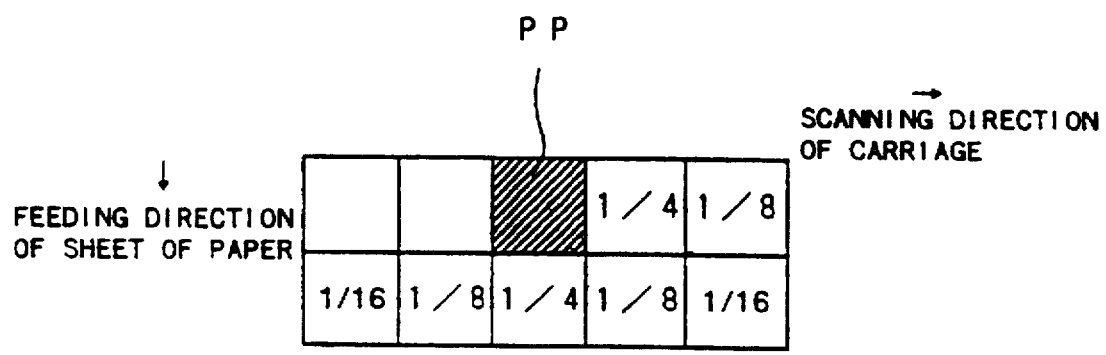
FIG. 16 shows weights added to the peripheral pixels, into which an error is distributed in the process of error distribution.

The corrected data DC is obtained by adding the diffusion error ΔDu to the light dot data Dx, because error diffusion is carried out for light dots. In the printing process by error diffusion, a density error occurring for a processed pixel is distributed in advance to peripheral pixels around the processed pixel with predetermined weights. The processing of step S135 accordingly reads the corresponding error and causes the error to affect the target pixel to be printed next. FIG. 16 illustrates a process of distributing the error occurring for a processed pixel PP, in which the on/off state of light dots has been determined, into peripheral pixels with specified weights. The density error is distributed to several pixels after the processed pixel PP with the determined on/off state in the scanning direction of the carriage and in the feeding direction of the sheet of paper P with predetermined weights (¼, ⅛, 1/16).

Figure 17:
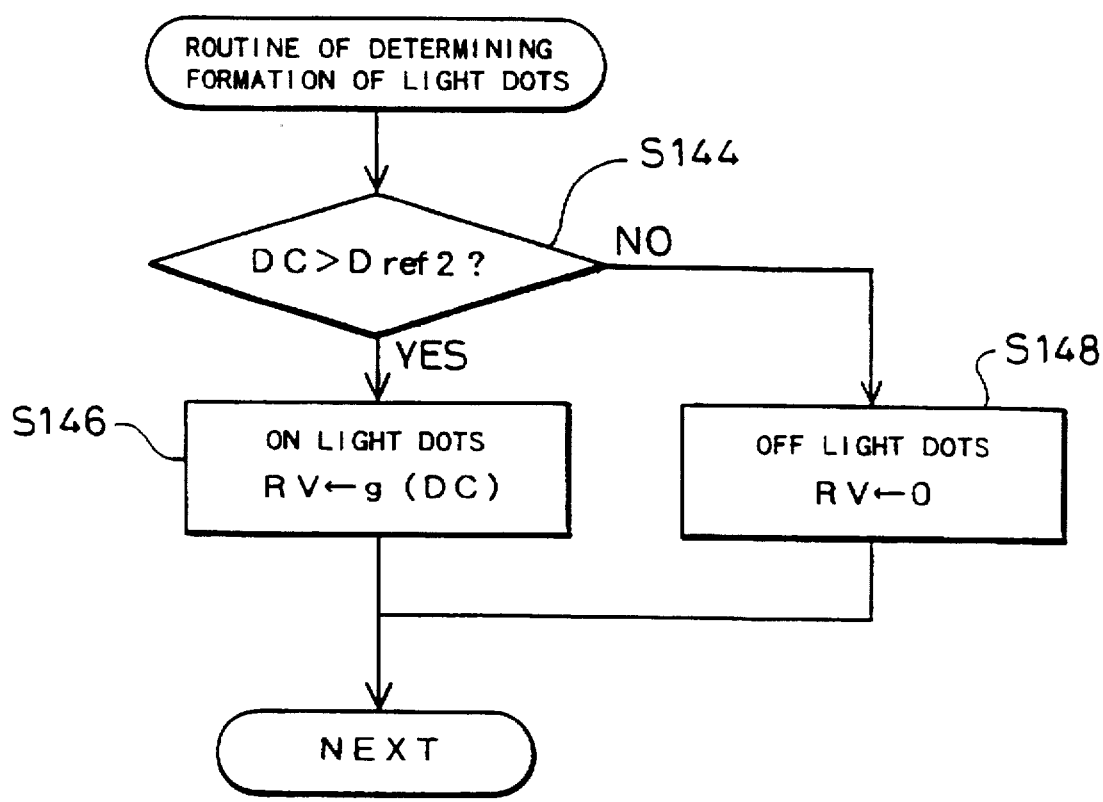
FIG. 17 is a flowchart showing a routine of determining formation of light dots.

Referring back to the flowchart of FIG. 12, after the calculation of the corrected data DC, it is determined whether or not the pixel is in the on state of deep dots (that is, dots of the cyan ink C1 are formed in the pixel) at step S138. In case of no formation of deep dots, the program proceeds to step S140 to determine the on/off state of low-density dots, that is, dots by the light cyan ink C2 (hereinafter referred to as light dot). The process of determining the on/off state of light dots follows a routine of determining formation of light dots shown in the flowchart of FIG. 17. The error diffusion method is applied to determine the on/off state of light dots (dots by the light cyan ink C2) in this embodiment. When the program enters the routine of FIG. 17, the corrected tone data DC according to the principle of error diffusion is compared with a threshold value Dref2 for light dots at step S144. The threshold value Dref2 is a reference value for determining whether or not dots of light ink should be formed in a target pixel and is fixed to the value 127 in this embodiment. The threshold value Dref2 may be a variable varying with the corrected data DC. By way of example, the threshold value Dref2 may be set as a function of corrected data DC, which has a minimum value and a maximum value in the vicinity of the minimum value and the maximum value of the corrected data DC, respectively. This effectively prevents delay of dot formation in the vicinity of the lower limit or upper limit of the tone or turbulence of dot formation (leaving a trail) observed in a certain range in the scanning direction in case of an abrupt change in tone in a specified area.

In case that the corrected data DC is greater than the threshold value Dref2 at step S144, the program determines the on state of light dots and calculates a resulting value RV (light dot evaluation value) at step S146. The resulting value RV here has a reference value 122 and is corrected by the corrected data DC, although it may be a fixed value. In case that the corrected data DC is not greater than the threshold value Dref2 at step S144, on the contrary, the program determines the off state of light dots and sets the value '0' to the resulting value RV at step S148.

Referring back to the flowchart of FIG. 12, after determining the on/off state of light dots and calculating the resulting value RV at step S140, the program proceeds to step S150 to calculate an error ERR. The error ERR is obtained by subtracting the resulting value RV from the corrected data DC. In case that neither deep dots nor light dots are formed, the resulting value RV is equal to zero and the corrected data DC is set to the error ERR. In this case, no density to be realized in the target pixel is obtained, so that the density is specified as the error ERR. In case that either deep dots or light dots are formed, on the other hand, the resulting value RV has a value corresponding to the dots, so that the difference between the corrected data DC and the resulting value RV is specified as the error ERR.

At subsequent step S160, the program carries out an error diffusion process. The error ERR obtained at step S150 is distributed into peripheral pixels around the processed pixel with predetermined weights (see FIG. 16). After the error diffusion process, the program moves to a next pixel and repeats the processing of steps S100 through S160 for the next pixel.

Figure 18A:
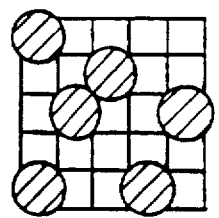
FIGS. 18a through 18h show formation of dots by a light ink C2 and formation of dots by a deep ink C1 in the first embodiment.
Figure 18B:
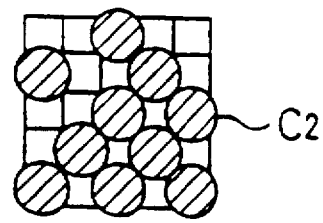

FIGS. 18a through 18h show examples of printing states of light dots and deep dots, with respect to the cyan ink C1 and the light cyan ink C2. In the range of low tone data (in the range of tone data=0/256 to 63/256 in this example), dots of only the light cyan ink C2 are formed as shown in FIGS. 18a and 18b. The proportion of light dots existing in a predetermined area increases with an increase in tone data.

Figure 18C:
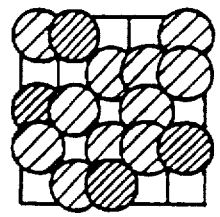
Figure 18D:
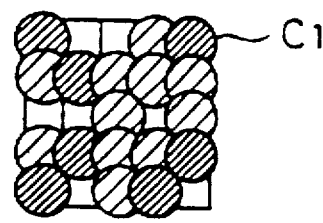
Figure 18E:
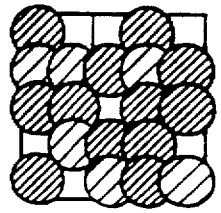

In the range of tone data exceeding a predetermined value (in the range exceeding 64/256 in this example), formation of deep dots starts and gradually increases while the proportion of light dots still increases as shown in FIG. 18c. In the range of higher tone data (in the range exceeding 95/256 in this example), the proportion of deep dots increases while the proportion of light dots decreases as shown in FIGS. 18d and 18e.

Figure 18F:
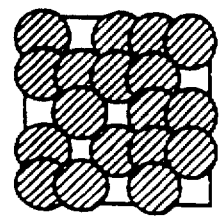
Figure 18G:
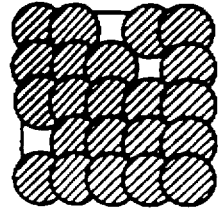
Figure 18H:
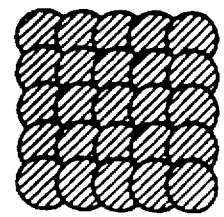

In the range of still higher tone data (in the range exceeding 191/256 in this example), no light dots but only deep dots are formed as shown in FIGS. 18f and 18g. When the tone data reaches the maximum, the recording ratio of deep dots is equal to 100% as shown in FIG. 18h. The whole surface of the sheet of paper P is covered with the dots of high-density ink (cyan ink C1).

As discussed above, the printer 20 of this embodiment prints images with two different inks having approximately four-fold difference in dye density. This structure lowers the degree of granularity especially in a low tone area and improves the printing quality. As shown in the table of FIG. 14, formation of deep dots by high-density ink (the cyan ink C1 in the example of FIG. 14) starts in the range of tone data smaller than the specific value of tone data that gives the maximum recording ratio of light dots by low-density ink (the light cyan ink C2 in the example of FIG. 14). This results in smooth color mixture at a joint between the record with light dots and the record with deep dots, thereby ensuring extremely high printing quality.

Since formation of dots by deep ink starts in the range of tone data smaller than the specific value of tone data that gives the maximum recording ratio of dots by light ink, the maximum recording ratio of dots by light ink can be reduced to approximately 60%. This does not cause a solid state of light ink in a low tone area, thereby preventing a pseudo-contour from being observed in the low tone area. This structure also ensures a high degree of freedom in distribution of dots by deep ink and accordingly gives a smooth distribution without any incompatibility. The resulting expression in the tone area where dots of high-density ink and dots of low-density ink start mixing is favorably natural.

In the range of tone data larger than the specific value of tone data that gives the maximum recording ratio of dots by light ink, the recording ratio of dots by light ink abruptly decreases. Dots of light ink are replaced by dots of deep ink with an increase in tone data. The replacement decreases the number of ink dots required for expressing a certain tone. This saves the amount of ink discharged and thereby the total amount of ink used. The recording ratio of dots by light ink abruptly decreases to zero, sufficiently before the recording ratio of dots by deep ink reaches 100% (at the input tone data=255). This prevents waste of light ink in case of printing the high-tone image area and decreases the total amount of ink discharged. This structure favorably restricts the amount of ink per unit area in the sheet of paper.

Figure 19:
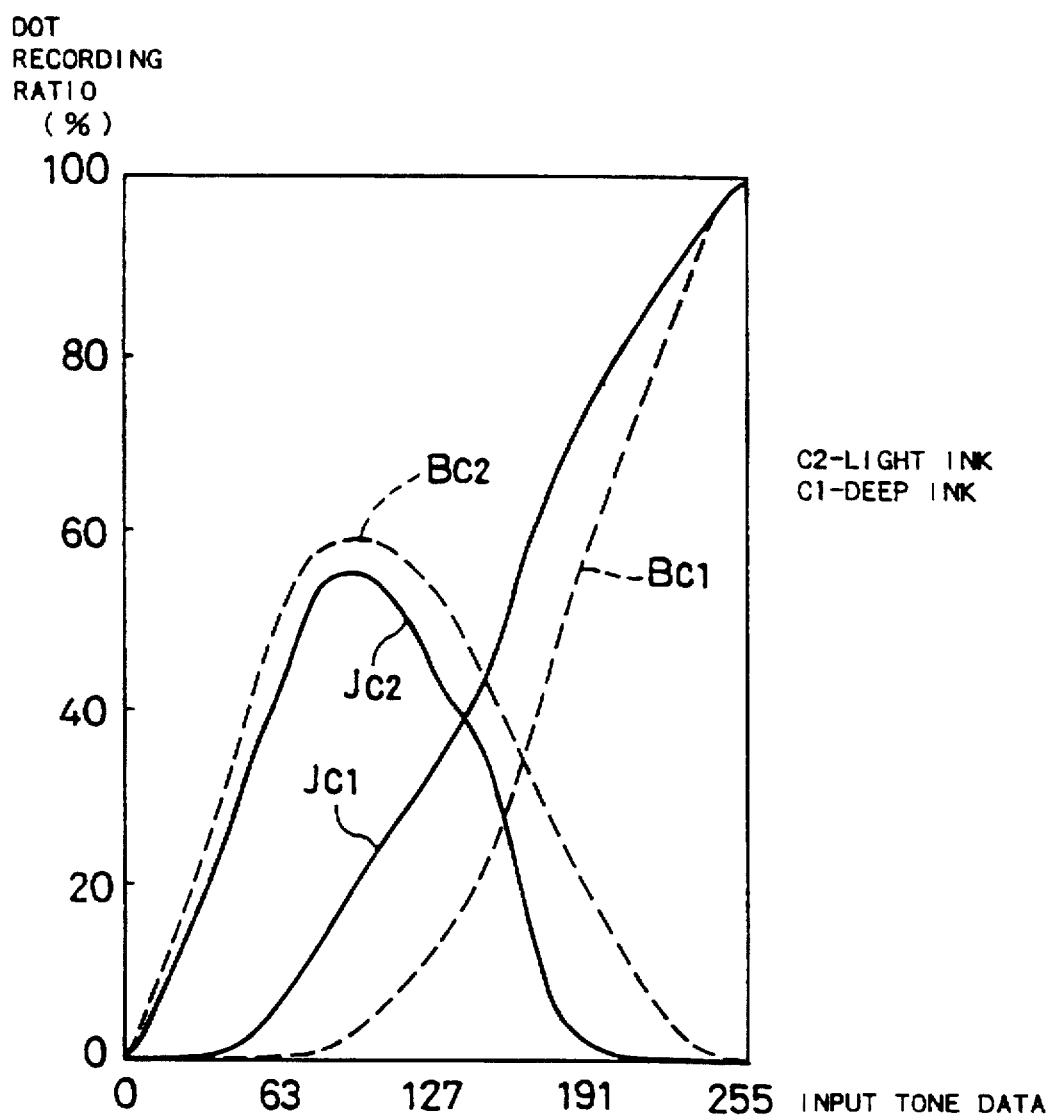
FIG. 19 is another table showing the relationship between tone data and recording ratios of light ink and deep ink.
Figure 20:
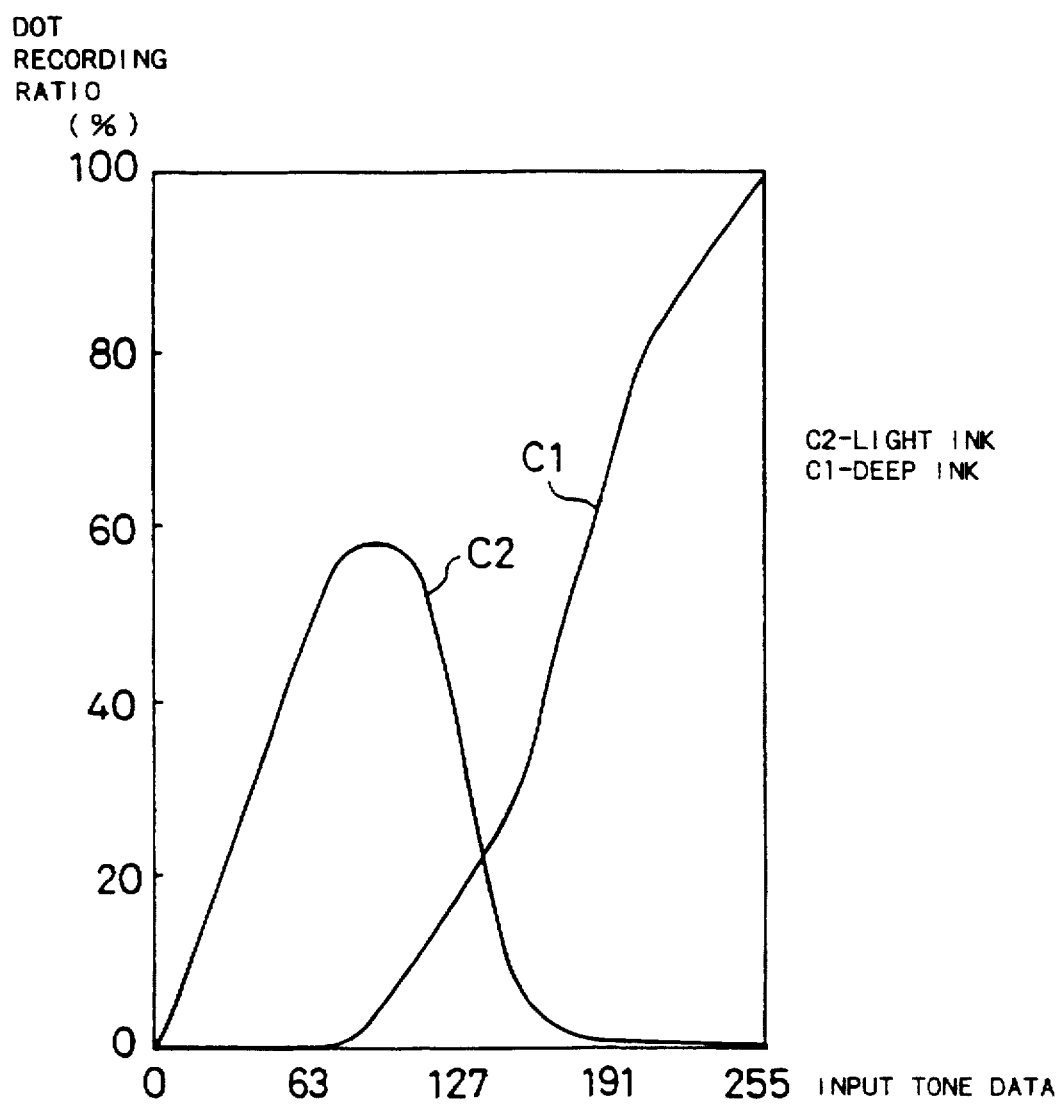
FIG. 20 is still another table showing the relationship between tone data and recording ratios of light ink and deep ink.

The relationship between the magnitude of tone data and the recording ratios of dots by light ink and deep ink is not limited to the table of FIG. 14. By way of example, the value of tone data at which formation of dots by deep ink starts may be set to be significantly lower than the value of the embodiment as shown by curves of solid line Jc1 and Jc2 in the table of FIG. 19. Alternatively the value of tone data at which the recording ratio of dots by light ink reaches substantially zero may be set to be significantly larger than the value of the embodiment as shown by curves of broken line Bc1 and Bc2 in the table of FIG. 19. The recording ratio of dots by light ink may decrease by an extremely large rate in the range of tone data larger than the specific value of tone data that gives the maximum recording ratio of dots by light ink as shown in FIG. 20.

In the first embodiment, the color ink cartridge 70a is separate from the black ink cartridge 70b. This allows the black ink cartridge 70b that is more frequently used for printing characters and the color ink cartridge 70a to be replaced at arbitrary timings. In the arrangement of color inks in the color ink cartridge 70a, inks of the same color (cyan or magenta) but different densities are arranged adjacent to each other. Namely the physical distance between the higher-density ink and the lower-density ink is fixed for each color. This enables the position of dots by deep ink and light ink to be adjusted accurately. A number of nozzles are formed in the feeding direction of the sheet of paper P in the structure of the embodiment. This structure enables high-speed printing.

The present invention is not restricted to the above embodiment, but there may be many modifications, changes, and alterations without departing from the scope or spirit of the main characteristics of the present invention. By way of example, three or more inks of the same color but different densities may be applied to the structure of the above embodiment. In this case, the ratio of dye densities of these inks may be specified like a geometric series (1:n:2×n: ... ) or as a relationship of like powers (1:n2:n4(( ), wherein n=2,3, . . . .

Although inks of different densities are used only for cyan and magenta in the embodiment, inks of different densities may also be used for yellow and black. Inks of different densities are not restricted to the combination of C, M, Y, and K but may be applied to another combination. Inks of different densities may be used for special colors, such as gold and silver.

In the embodiment, the program for regulating deep dots and light dots is set in the printer driver 96 of the computer 90. The program may, however, be set in the printer 20. In the latter case, the computer 90 sends image information written in a language, such as PostScript, and the printer 20 has the halftone module 99 and the other required elements. In the embodiment, the software realizing these functions is stored in the hard disk 16 of the computer 90 and incorporated into the operating system in the form of the printer driver at the time of activation of the computer 90. In accordance with another possible application, the software may be stored in a portable storage medium (carriable storage medium), such as floppy disks and CD-ROMs and transferred from the storage medium to the main memory of the computer system or an external storage device. The software may be transferred from the computer 90 to the printer 20. In case that the printing system 10 includes an apparatus for supplying the software via a communication line, the contents of the halftone module may be transferred to either the computer 90 or the printer 20 via the communication line.

Figure 21A:
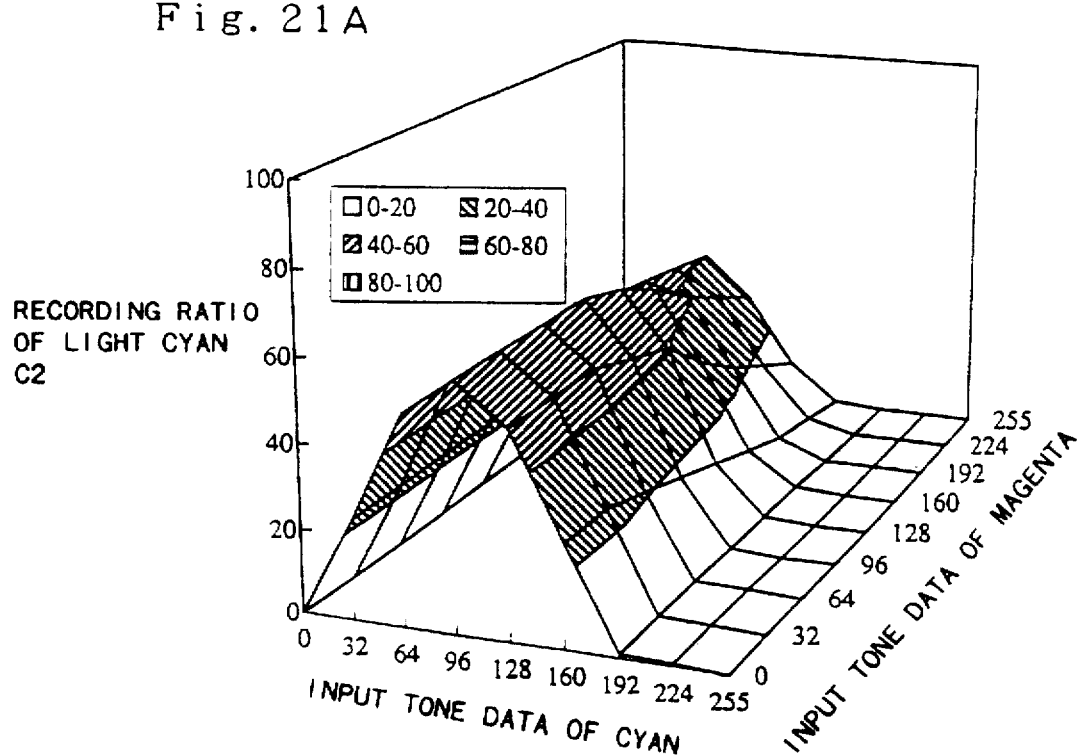
FIGS. 21A and 21B are graphs showing recording ratios of light cyan ink and cyan ink, which are used in a second embodiment according to the present invention.
Figure 21B:
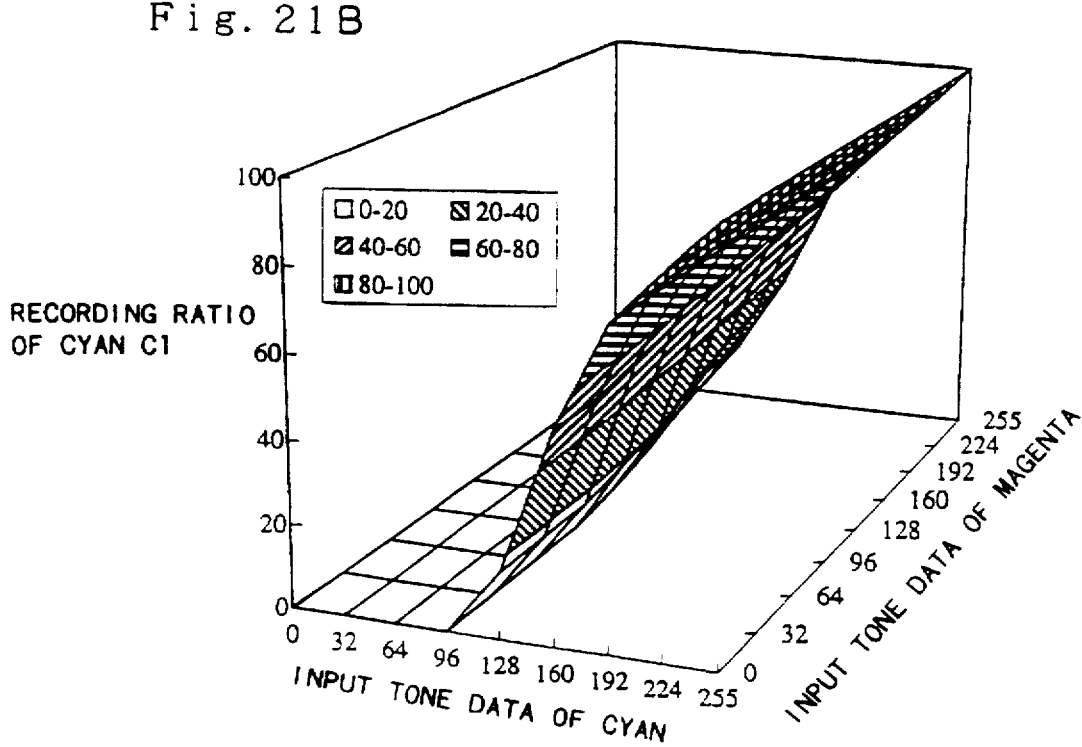
Figure 22A:
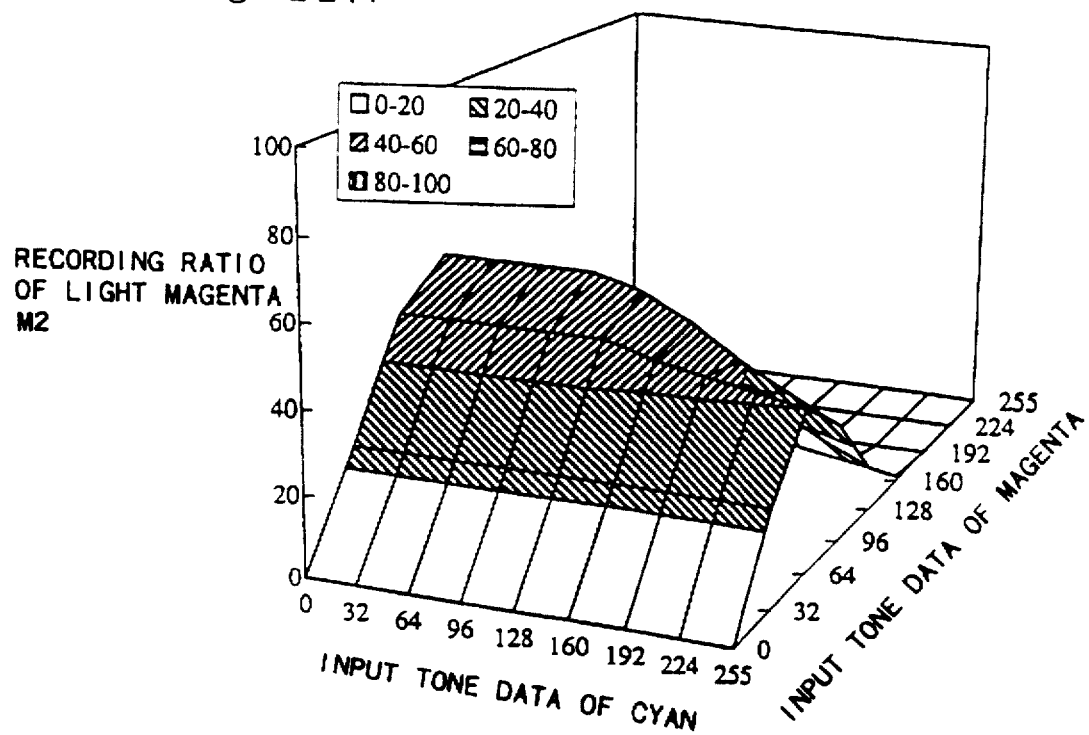
Figure 22B:
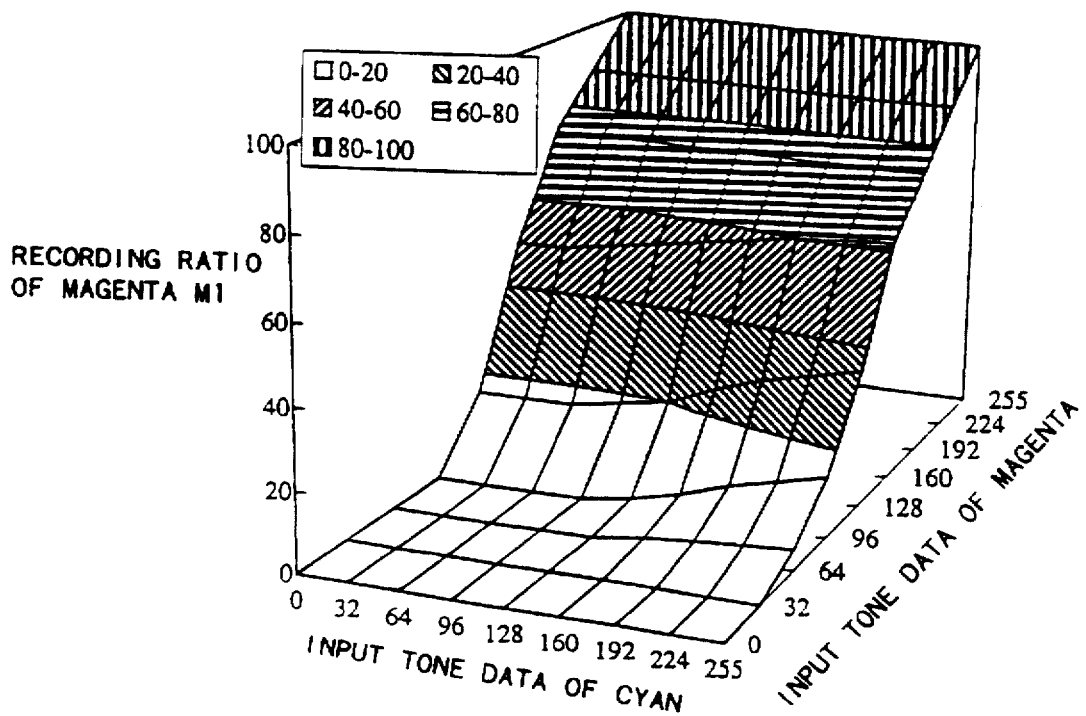

The following describes a second embodiment according to the present invention. A printer 200 of the second embodiment has the same hardware structure as that of the printer 20 of the first embodiment. The only difference from the first embodiment is the processing carried out in the halftone module 99 of the computer 90. In the first embodiment described above, the processing in the halftone module 99 refers to the relationship shown in the table of FIG. 14, in order to determine the recording ratios of dots by deep ink and light ink based on the tone data of pixels in an original image. In the second embodiment, on the other hand, the processing in the halftone module 99 refers to the graphs of FIGS. 21A and 21B. As shown in FIGS. 21A and 21B, in the second embodiment, the recording ratios of dots by light ink and deep ink are varied not only with the tone data of a target color ink to be currently processed by the halftone module 99, for example, the tone data of cyan ink, but with the tone data of another color ink included in a target pixel, for example, the tone data of magenta ink. In case that the target pixel requires a large amount of magenta ink, the processing in the halftone module 99 decreases the recording ratio of dots by the light cyan ink C2 while increasing the recording ratio of dots by the cyan ink C1 as shown in FIGS. 21A and 21B. In a similar manner, in case that the target pixel requires a large amount of cyan ink, the processing in the halftone module 99 decreases the recording ratio of dots by the light magenta ink M2 while increasing the recording ratio of dots by the magenta ink M1 as shown in FIGS. 22A and 22B.

Like the first embodiment, the structure of the second embodiment prints images with at least two inks of different dye densities and starts formation of deep dots by high-density ink (the cyan ink C1 in the example of FIG. 14) in the range of tone data smaller than the specific value of tone data that gives the maximum recording ratio of light dots by low-density ink (the light cyan ink C2 in the example of FIG. 14). This results in smooth color mixture at a joint between the record with light dots and the record with deep dots, thereby ensuring extremely high printing quality. The structure of the second embodiment decreases the recording ratio of dots by low-density ink (C2 or M2) while increasing the recording ratio of dots by high-density ink (C1 or M2), with an increase in density of another color ink required for a target pixel. Because of stain of another color ink, this method keeps the degree of granularity substantially equal to the level in the monochromatic case.

Like the first embodiment, the structure of the second embodiment starts formation of dots by deep ink in the range of tone data smaller than the specific value of tone data that gives the maximum recording ratio of dots by light ink. The second embodiment, however, lowers the limit of formation of dots by light ink and advances formation of dots by deep ink. This structure also ensures natural expression in the tone range where dots of high-density ink and dots of low density ink start mixing.

In case that the target pixel requires a high recording ratio of magenta ink or cyan ink, the structure of the second embodiment replaces dots of low-density ink (light cyan ink C2 or light magenta ink M2) with dots of high-density ink (cyan ink C1 or magenta ink M1) to be recorded at the position corresponding to the target pixel. This structure reduces the total amount of ink discharged per unit area in the sheet of paper, without deteriorating the picture quality. This enables discharge of each color ink with a sufficient margin to the ink duty set for each paper, that is, restriction of the amount of ink dischargeable per unit area. The structure of the second embodiment thus effectively prevents the sheet of paper from being swollen with ink or unnatural color expression due to the restriction of ink duty.

Figure 23:
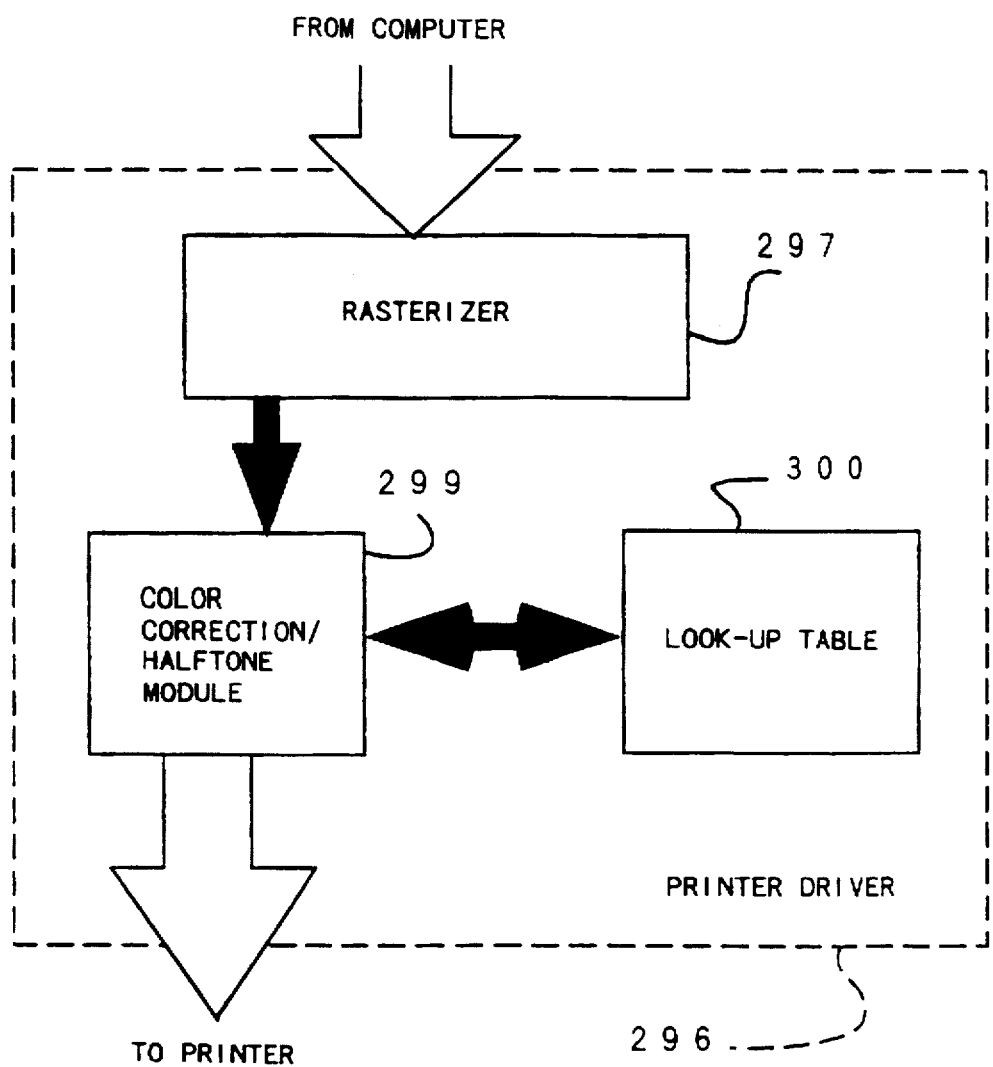
FIG. 23 is a block diagram showing a modified structure of a printer driver 296.
Figure 24A:
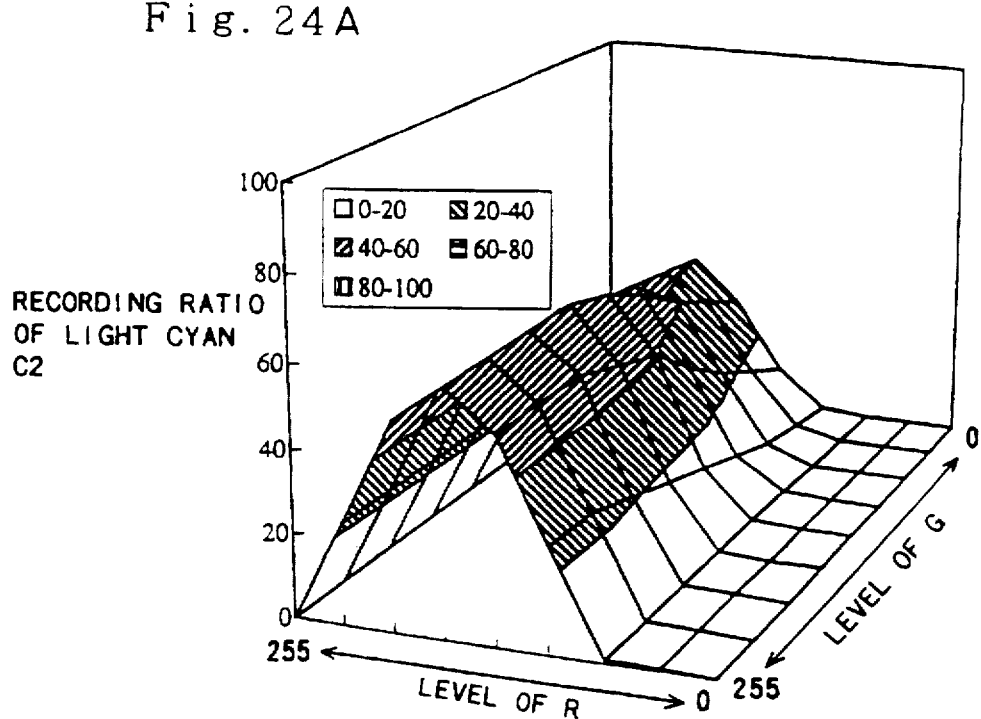
FIGS. 24A and 24B are look-up tables used for specifying recording ratios of low-density ink and high-density ink directly from RGB data.
Figure 24B:
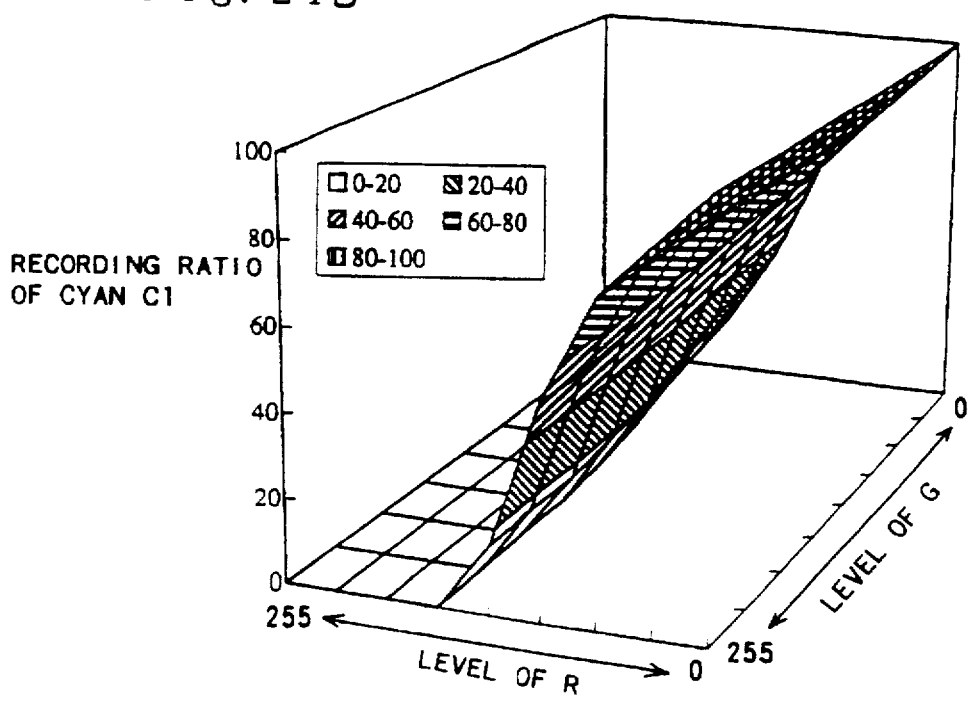
Figure 25A:
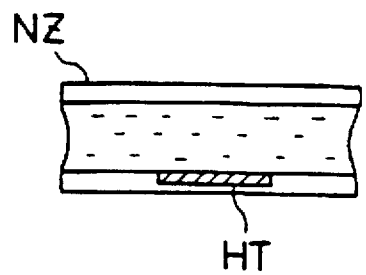
FIGS. 25A through 25E show another mechanism for discharging ink particles.
Figure 25B:
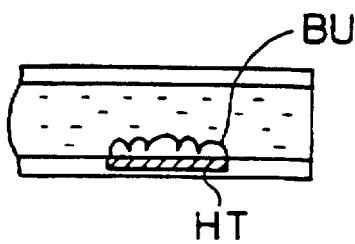
Figure 25C:
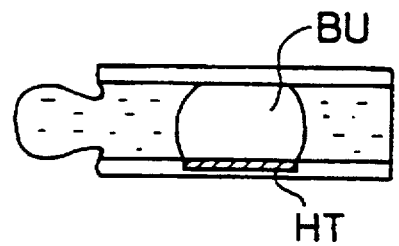
Figure 25D:
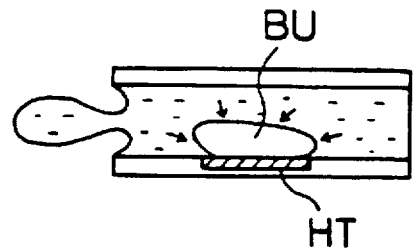
Figure 25E:
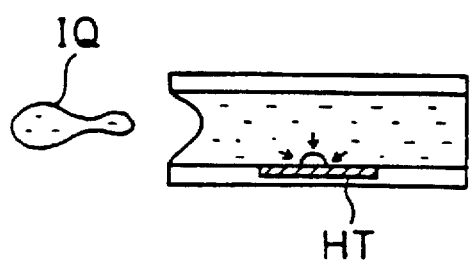

The structure of the second embodiment first specifies the densities (tone data) of cyan, magenta, and yellow required for realizing the hue of a target pixel, and then determines the recording ratios of dots by deep ink and light ink of each color, based on the correlation of tone data. In accordance with another possible application, the recording ratios of dots by deep ink and light ink of each color may be determined directly from RGB data of a target pixel in a printer driver. As shown in FIG. 23, for example, a rasterizer 297, a color correction/halftone module 299, and a look-up table 300 are arranged inside a printer driver 296. After the rasterizer 297 gives RGB data of each target pixel, the procedure of the modified example refers to the look-up table 300 and determines the recording ratios of light ink and deep ink for cyan and magenta and the recording ratio of yellow ink, directly based on the RGB data. FIGS. 24A and 24B show examples of the look-up table used for determining the recording ratios of dots by the light cyan ink C2 and the cyan ink C1 directly from the RGB data of a target pixel.

The procedure of the modified application determines the recording ratios of the respective color inks directly from the RGB data and thereby simplifies the structure. Both the second embodiment and its modified example decrease the recording ratio of dots by light ink for cyan (or magenta) while increasing the recording ratio of dots by deep ink with an increase in density of magenta (or cyan) required for the target pixel. The recording ratios of dots by deep ink and light ink may also be varied by the density of yellow. In case that none of the recording ratios of cyan ink, magenta ink, and yellow ink is zero in a target pixel, an applicable procedure replaces the three color inks by black ink. The procedure decreases the recording ratio of dots by the light cyan ink C2 or the light magenta ink M2 and increases the recording ratio of dots by the cyan ink C1 or the magenta ink M1 according to the density of black ink.

In the embodiments discussed above, the recording ratio of dots by the light cyan ink C2 or the light magenta ink M2 is decreased according to the density of magenta ink or the density of cyan ink at the position corresponding to the target pixel. The principle of the present invention is, however, not restricted to this relationship. The recording ratio of dots by light ink and the recording ratio of dots by deep ink can be arbitrarily determined according to the density of another ink at the position corresponding to the target pixel. By way of example, in case that a plurality of inks are used to avoid the restriction of ink duty, a possible procedure temporarily decreases the amount of deep ink and increases the amount of light ink, in the process of lowering the recording ratio of dots by light ink or replacing three colors by black in a pixel where all the three colors, that is, cyan, magenta, and yellow, exist. This procedure lowers the degree of granularity at the joint.

In the above embodiments, a predetermined voltage is applied to the piezoelectric elements PE for a predetermined time period, in order to discharge both light ink and deep ink. Another method is, however, applicable to discharge inks. The available ink-discharge techniques can be classified into two types; that is, the method of separating ink particles from a continuous jet stream of ink and the on-demand method applied in the above embodiments. The former type includes a charge modulation method that separates droplets of ink from a jet stream of ink by means of charge modulation and a micro-dot method that utilizes fine satellite particles produced in the process of separating large-diametral particles from a jet stream of ink. These methods are also applicable to the printing system of the present invention that uses inks of different densities.

The on-demand type, on the other hand, produces ink particles for the respective dot units according to the requirements. A method included in the on-demand type, other than the method utilizing the piezoelectric elements applied in the above embodiments, arranges a heating body HT in the vicinity of nozzles NZ of ink, produces bubbles BU by heating ink, and makes ink particles IQ discharged by the pressure of the bubbles BU as shown in FIGS. 25A through 25E. Such on-demand type methods are also applicable to the printing system of the present invention that uses inks of different densities.

It should be clearly understood that the above embodiments are only illustrative and not restrictive in any sense. The scope and spirit of the present invention are limited only by the terms of the appended claims.

What is claimed is:

1. A printing system having a head, from which at least two inks of different densities are dischargeable, and recording a multi-tone image by a distribution of dots by said at least two inks of different densities, said printing system comprising:

input means for inputting tone signals of said original image to be printed;

19 definition means for defining a recording characteristic that starts formation of dots by a higher-density ink in a range of said tone signals lower than a specific tone signal which gives a maximum recording density of dots by a lower-density ink;

specifying means for specifying existence and non-existence of dots by said at least two inks of different densities according to said tone signals, based on said recording characteristic; and regulating means for regulating discharge of each ink from said head, so as to realize a tone expression according to said existence and non-existence of dots by said at least two inks of different densities.

2. A printing system in accordance with claim 1, wherein said definition means has a table for specifying the recording densities of dots by said at least two inks of different densities corresponding to said tone signals.

3. A printing system in accordance with claim 1, wherein said at least two inks of different densities comprise a high-density ink and a low density ink and a dye density of said low-density ink is approximately one quarter a dye density of said high-density ink.

4. A printing system in accordance with claim 1, wherein said head comprises a plurality of heads for discharging said at least two inks of different densities with respect to a plurality of color inks having different hues, said printing system further comprising a set of said definition means, said specifying means, and said regulating means corresponding to said plurality of color inks having different hues.

5. A printing system in accordance with claim 4, wherein said plurality of color inks having different hues comprise cyan ink and magenta ink.

6. A printing system in accordance with claim 4, wherein each said specifying means specifies recording densities respect to one color ink, in connection with said tone signals of another color ink.

7. A printing system in accordance with claim 4, wherein each said specifing means comprises correction means for decreasing the recording density of dots by said lower-density ink in a target pixel with an increase in density of another color ink discharged to said target pixel.

8. A printing system in accordance with claim 4, wherein each said definiton means having a look-up table for directly specifying the recording densities of deep dots and light dots with respect to said plurality of color inks having different hues, from said tone signals.

9. A printing system in accordance with claim 1, wherein said head comprises a mechanism for discharging ink particles under a pressure applied to each ink running through an ink conduit by application of a voltage to a piezoelectric element disposed in said ink conduit.

10. A printing system in accordance with claim 1, wherein said head comprises a mechanism for discharging ink particles under a pressure applied to each ink running through an ink conduit by air bubbles that are produced by a supply of electricity to a heating body disposed in said ink conduit.

11. A printing system in accordance with claim 9, wherein said head has a plurality of nozzles for spraying said ink particles with respect to each color ink of each density, said plurality of nozzles being arranged in a feeding direction of a sheet of paper, on which the multi-tone image is printed.

12. A printing system in accordance with claim 10, wherein said head has a plurality of nozzles for spraying said ink particles with respect to each color ink of each density, said plurality of nozzles being arranged in a feeding direction of a sheet of paper, on which the multi-tone image is printed.

20

13. A printing system having a head, from which at least two inks of different densities are dischargeable, and recording a multi-tone image by a distribution of dots by said at least two inks of different densities, said printing system comprising:

input means for receiving tone signals of an original image to be printed;

definition means for defining a recording characteristic that abruptly decreases a recording density of dots by a lower-density ink in a range of said tone signals higher than a specific tone signal which gives a maximum recording density of dots by said lower-density ink;

specifying means for specifying existence and non-existence of dots by said at least two inks of different densities according to the input tone signals, based on said recording characteristic; and regulating means for regulating discharge of each ink from said head, so as to realize a tone expression according to the existence and non-existence of dots by said at least two inks of different densities.

14. A printing system in accordance with claim 13, wherein said definition means has a table for specifying the recording densities of dots by said at least two inks of different densities corresponding to said tone signals.

15. A printing system in accordance with claim 13, wherein said at least two inks of different densities comprise a high-density ink and a low density ink and a dye density of said low-density ink is approximately one quarter a dye density of said high-density ink.

16. A printing system in accordance with claim 13, wherein said head comprises a plurality of heads for discharging said at least two inks of different densities with respect to a plurality of color inks having different hues, said printing system further comprising a set of said definition means, said specifying means, and said regulating means corresponding to said plurality of color inks having different hues.

17. A printing system in accordance with claim 16, wherein said plurality of color inks having different hues comprise cyan ink and magenta ink.

18. A printing system in accordance with claim 16, wherein each said specifying means specifies recording densities respect to one color ink, in connection with said tone signals of another color ink.

19. A printing system in accordance with claim 16, wherein each said specifing means comprises correction means for decreasing the recording density of dots by said lower-density ink in a target pixel with an increase in density of another color ink discharged to said target pixel.

20. A printing system in accordance with claim 16, wherein each said definiton means having a look-up table for directly specifying the recording densities of deep dots and light dots with respect to said plurality of color inks having different hues, from said tone signals.

21. A printing system in accordance with claim 13, wherein said head comprises a mechanism for discharging ink particles under a pressure applied to each ink running through an ink conduit by application of a voltage to a piezoelectric element disposed in said ink conduit.

22. A printing system in accordance with claim 13, wherein said head comprises a mechanism for discharging ink particles under a pressure applied to each ink running through an ink conduit by air bubbles that are produced by a supply of electricity to a heating body disposed in said ink conduit.

23. A printing system in accordance with claim 21, wherein said head has a plurality of nozzles for spraying said ink particles with respect to each color ink of each density, said plurality of nozzles being arranged in a feeding direction of a sheet of paper, on which the multi-tone image is printed.

24. A printing system in accordance with claim 22, wherein said head has a plurality of nozzles for spraying said ink particles with respect to each color ink of each density, said plurality of nozzles being arranged in a feeding direction of a sheet of paper, on which the multi-tone image is printed.

25. A printing system for regulating a distribution of dots formed by a plurality of color inks having different hues to print an image, said printing system comprising:

a head for discharging said plurality of color inks having different hues as well as at least two inks of different densities with respect to one of said plurality of color inks having different hues;

input means for receiving tone signals of an original image to be printed;

dot frequency determination means for specifying recording densities of dots by said plurality of color inks having different hues based on said tone signals, and determining a recording density of dots formed in a target pixel by a low-density ink among said at least two inks of different densities, in connection with a density of another color ink discharged to said target pixel; and dot recording means for regulating discharge of each ink from said head, so as to record said dots by said plurality of color inks having different hues as well as deep dots and light dots by said at least two inks of different densities on a recording medium.

26. A printing system in accordance with claim 25, wherein said dot frequency determination means comprises correction means for correcting said recording density of dots formed in said target pixel by said low-density ink, based on a relationship that lowers the recording density of dots by said low-density ink with an increase in density of another color ink discharged to said target pixel.

27. A printing system in accordance with claim 25, wherein said dot frequency determination means comprises a look-up table for directly specifying recording densities of said deep dots and light dots with respect to said one of said plurality of color inks having different hues, from said tone signals.

28. A printing system in accordance with claim 25, wherein said head comprises a mechanism for discharging ink particles under a pressure applied to each ink running through an ink conduit by application of a voltage to a piezoelectric element disposed in said ink conduit.

29. A printing system in accordance with claim 25, wherein said head comprises a mechanism for discharging ink particles under a pressure applied to each ink running through an ink conduit by air bubbles that are produced by a supply of electricity to a heating body disposed in said ink conduit.

30. A printing system in accordance with claim 28, wherein said head has a plurality of nozzles for spraying said ink particles with respect to each color ink of each density, said plurality of nozzles being arranged in a feeding direction of a sheet of paper, on which the image is printed.

31. A printing system in accordance with claim 29, wherein said head has a plurality of nozzles for spraying said ink particles with respect to each color ink of each density, said plurality of nozzles being arranged in a feeding direction of a sheet of paper, on which the image is printed.

32. A method of controlling a head, from which at least two inks of different densities are dischargeable, and regulating a distribution of dots by said at least two inks of different densities based on tone signals of an original image to be printed, so as to record a multi-tone image, said method comprising the steps of:

storing a recording characteristic that starts formation of dots by a higher-density ink in a range of tone signals lower than a specific tone signal which gives a maximum recording density of dots by a lower-density ink;

inputting the tone signals of said original image to be printed;

specifying existence and non-existence of dots by said at least two inks of different densities according to the input tone signals, based on said recording characteristic; and regulating discharge of each ink from said head, so as to realize a tone expression according to the existence and non-existence of dots by said at least two inks of different densities.

33. A method of controlling a head, from which at least two inks of different densities are dischargeable, and regulating a distribution of dots by said at least two inks of different densities based on tone signals of an original image to be printed, so as to record a multi-tone image, said method comprising the steps of:

storing a recording characteristic that abruptly decreases a recording density of dots by a lower-density ink in a range of tone signals higher than a specific tone signal which gives a maximum recording density of dots by said lower-density ink;

inputting the tone signals of said original image to be printed;

specifying existence and non-existence of dots by said at least two inks of different densities according to the input tone signals, based on said recording characteristic; and regulating discharge of each ink from said head, so as to realize a tone expression according to the existence and non-existence of dots by said at least two inks of different densities.

34. A method of regulating a distribution of dots formed by a plurality of color inks having different hues to record an image, said method comprising the steps of:

providing a head for discharging said plurality of color inks having different hues as well as at least two inks of different densities with respect to one of said plurality of color inks having different hues;

inputting tone signals of an original image to be printed;

specifying recording densities of dots by said plurality of color inks having different hues based on said input tone signals, and determining a recording density of dots formed in a target pixel by a low-density ink among said at least two inks of different densities, in connection with a density of another color ink discharged to said target pixel; and regulating discharge of each ink from said head, so as to record the dots by said plurality of color inks having different hues as well as deep dots and light dots by said at least two inks of different densities on a recording medium.

* * * * *